(12) United States Patent
Singh et al.

(10) Patent No.: US 12,457,570 B2
(45) Date of Patent: Oct. 28, 2025

(54) TIMING ADVANCE FOR TSN

(71) Applicant: Telefonaktiebolaget LM Ericsson (publ), Stockholm (SE)

(72) Inventors: Bikramjit Singh, Kirkkonummi (FI); John Walter Diachina, Garner, NC (US); Magnus Sandgren, Staffanstorp (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 636 days.

(21) Appl. No.: 17/765,263

(22) PCT Filed: Oct. 5, 2020

(86) PCT No.: PCT/SE2020/050943
§ 371 (c)(1),
(2) Date: Mar. 30, 2022

(87) PCT Pub. No.: WO2021/066732
PCT Pub. Date: Apr. 8, 2021

(65) Prior Publication Data
US 2022/0361128 A1    Nov. 10, 2022

Related U.S. Application Data

(60) Provisional application No. 62/910,187, filed on Oct. 3, 2019.

(51) Int. Cl.
*H04W 56/00* (2009.01)
*H04L 5/00* (2006.01)

(52) U.S. Cl.
CPC ....... *H04W 56/0045* (2013.01); *H04L 5/0051* (2013.01); *H04W 56/001* (2013.01)

(58) Field of Classification Search
CPC ........... H04W 56/0045; H04W 56/001; H04W 56/004; H04L 5/0051
See application file for complete search history.

(56) References Cited

U.S. PATENT DOCUMENTS

| 2010/0118895 | A1 | 5/2010 | Radulescu |
| 2018/0242268 | A1 | 8/2018 | Rune et al. |

(Continued)

FOREIGN PATENT DOCUMENTS

| CN | 105743599 A | 7/2016 |
| CN | 109891957 A | 6/2019 |

(Continued)

OTHER PUBLICATIONS

Intel, On the usage of rateRatio, one-step vs two-step sync operation and dedicated QoS Flow, Jun. 28, 2019, SA WG2 Meeting # S2-134, S2-1908317 (Year: 2019).*

(Continued)

*Primary Examiner* — Charles C Jiang
*Assistant Examiner* — Rachel Elizabeth Marks
(74) *Attorney, Agent, or Firm* — Murphy, Bilak & Homiller, PLLC

(57) ABSTRACT

Methods for aligning sending of a network system clock time to a wireless device with initiating a propagation delay compensation procedure for the wireless device. An example method, in a network node, comprises determining that a propagation delay compensation procedure for the wireless device is to be initiated or has been initiated, and sending an indication of a network system clock time to the wireless device in association with the propagation delay compensation procedure.

17 Claims, 10 Drawing Sheets

---

| DETERMINE THAT PROPAGATION DELAY COMPENSATION PROCEDURE IS TO BE INITIATED OR HAS BEEN INITIATED | 410 |

| SEND AN INDICATION OF NETWORK SYSTEM CLOCK TIME TO WIRELESS DEVICE, IN ASSOCIATION WITH PROPAGATION DELAY COMPENSATION PROCEDURE | 420 |

(56) References Cited

U.S. PATENT DOCUMENTS

| | | | |
|---|---|---|---|
| 2019/0150141 A1 | 5/2019 | Irukulapati et al. | |
| 2020/0322908 A1* | 10/2020 | Prakash | H04W 56/004 |
| 2021/0345272 A1 | 11/2021 | Chatterjee et al. | |
| 2022/0239398 A1 | 7/2022 | Li | |
| 2023/0068462 A1 | 3/2023 | Moon et al. | |
| 2023/0141032 A1 | 5/2023 | Awad et al. | |
| 2023/0413204 A1 | 12/2023 | Babaei | |

FOREIGN PATENT DOCUMENTS

| | | |
|---|---|---|
| WO | 2020081062 A1 | 4/2020 |
| WO | 2020093000 A1 | 5/2020 |
| WO | 2020183014 A1 | 9/2020 |
| WO | 2021066730 A1 | 4/2021 |
| WO | 2021066732 A1 | 4/2021 |
| WO | 2021181363 A1 | 9/2021 |
| WO | 2021198070 A1 | 10/2021 |

OTHER PUBLICATIONS

Cambridge Dictionary definition of Association; retrieved from the Internet on Feb. 28, 2025; URL <https://dictionary.cambridge.org/us/dictionary/english/association> (Year: 2025).*

3GPP , "3rd Generation Partnership Project; Technical Specification Group Radio Access Network; NR; Requirements for support of radio resource management (Release 16)", 3GPP TS 38.133 V16.3.0, Mar. 2020, 1-1165.

3GPP , "3rd Generation Partnership Project; Technical Specification Group Services and System Aspects; System architecture for the 5G System (5GS); Stage 2 (Release 16)", 3GPP TS 23.501 V16.4.0, Mar. 2020, 1-430.

Unknown, Author , "On Downlink Delay Compensation", 3GPP TSG-RAN WG2 #107bis Tdoc, R2-1912549, Chongqing, China, Oct. 14-18, 2019, 1-3.

Unknown, Author , "SIB and RRC-unicast delivery in reference time provisioning", 3GPP TSG-RAN WG2 #105bis, Tdoc R2-1904041, Xi'an, China, Apr. 8-12, 2019, 1-8.

Unknown, Author , "Reply LS on propagation delay compensation for reference time information delivery", 3GPP TSG-RAN WG1#98, R1-1909906, Prague, CZ, Aug. 26-30, 2019, 1-2.

3GPP, "3rd Generation Partnership Project; Technical Specification Group Radio Access Network; NR; Radio Resource Control (RRC) protocol specification (Release 15)", 3GPP TS 38.331 V15.6.0, Jun. 2019, 1-519.

3GPP, "3rd Generation Partnership Project; Technical Specification Group Radio Access Network; NR; Requirements for support of radio resource management (Release 16)", 3GPP TS 38.133 V16.0.0, Jun. 2019, 1-999.

Ericsson, "Analysis of Time Synchronization Accuracy over Uu Interface", 3GPP TSG RAN WG1 Ad-Hoc Meeting 1901, Tdoc R1-1900181, Taipei, Taiwan, Jan. 21-25, 2019, 1-5.

Ericsson, "Enhancements for support of time synchronization", 3GPP TSG-RAN WG2 #111e, Tdoc R2-2006701, Electronic meeting, Aug. 17-28, 2020, 1-5.

Ericsson, "Other Enhancements to Uplink and Downlink Transmissions for NR URLLC—Response to Incoming LS", 3GPP TSG-RAN WG1 Meeting #98, Tdoc R1-1908127, Prague, CZ, Aug. 26-30, 2019, 1-10.

Intel, "On the usage of rateRatio, one-step vs two-step sync operation and dedicated QoS Flow", SA WG2 Meeting #S2-134, S2-1908317, (revision of S2-1907758), Sapporo, JP, Jun. 24-28, 2019, 1-6.

Mahmood, Aamir, et al., "Time Synchronization in 5G Wireless Edge: Requirements and Solutions for Critical-MTC", arXiv:1906.06380v1 [cs.IT], https://www.researchgate.net/publication/333842214, Jun. 2019, 1-8.

Unknown, Author, "IEC/IEEE 60802—Time-Sensitive Networking Profile for Industrial Automation", IEC/IEEE (Joint Dev) 60802, 2019, 1-49.

3GPP, "3rd Generation Partnership Project; Technical Specification Group Services and System Aspects; Study on enhancement of 5G System (5GS) for vertical and Local Area Network (LAN) services (Release 16)", 3GPP TR 23.734 V16.1.0, Mar. 2019, 1-111.

* cited by examiner

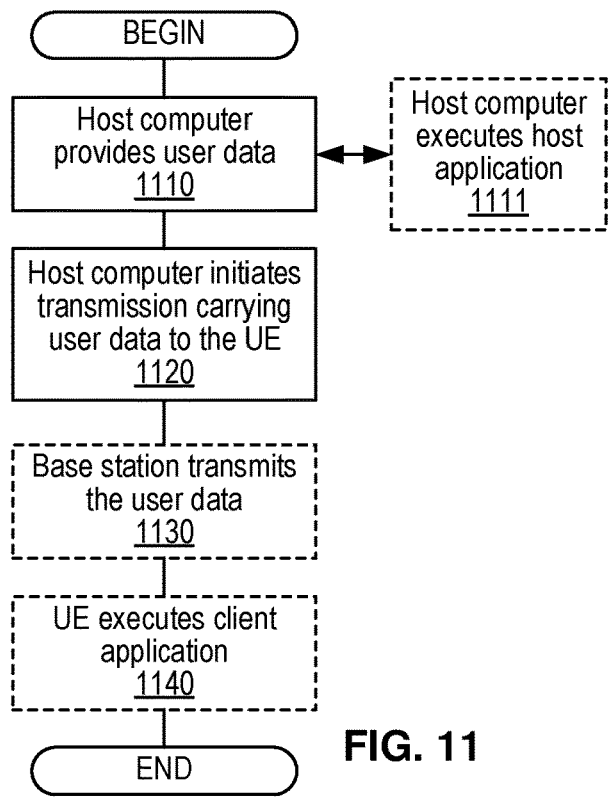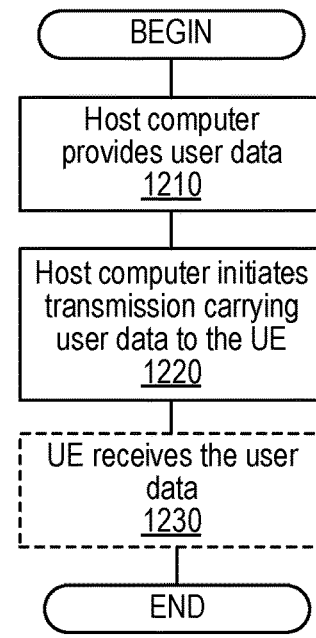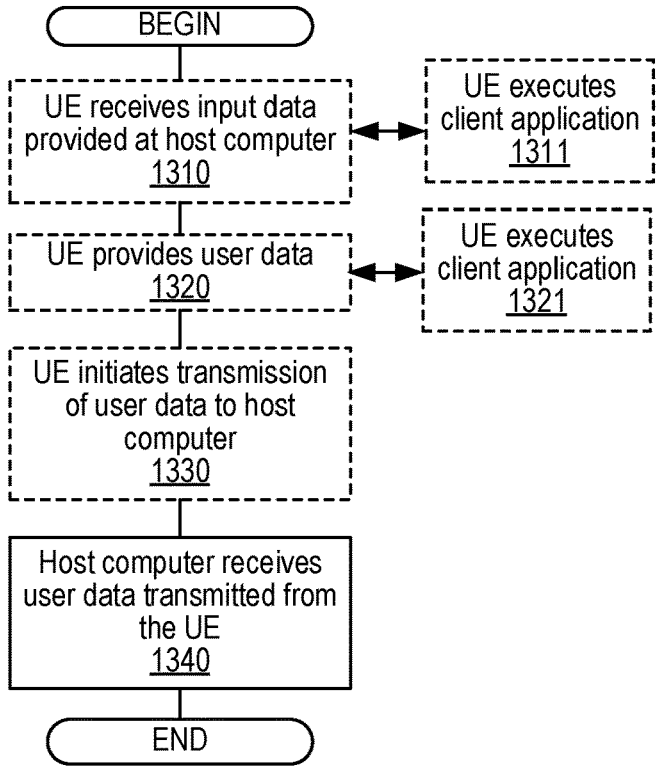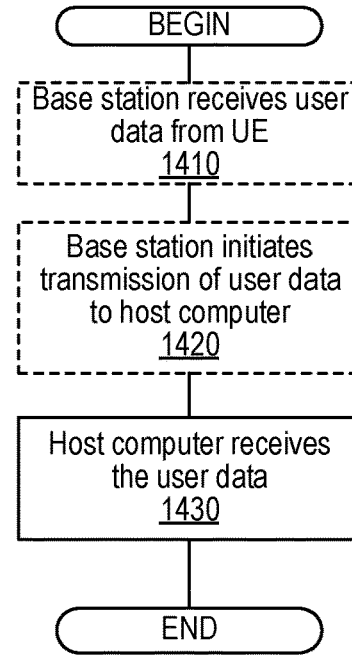
FIG. 11
FIG. 12
FIG. 13
FIG. 14

TIMING ADVANCE FOR TSN

TECHNICAL FIELD

The present disclosure is generally related to transferring clock times in a wireless network and is more particularly related to techniques for aligning the sending of a network system clock time to a wireless device with an initiation of a propagation delay compensation procedure for the wireless device.

BACKGROUND

The $3^{rd}$-Generation Partnership Project (3GPP) is currently developing specifications for a fifth-generation (5G) radio access technology commonly referred to as New Radio (NR). Among many other features, NR is to support Time Sensitive Networking (TSN), for example, 5G integrated in Ethernet-based industrial communication networks. Use cases for TSN may be factory automation networking related.

A 3GPP Timing Advance command is utilized in cellular communication for uplink transmission synchronization. A timing advance is a negative offset, at the wireless device, between the start of a received downlink subframe and a transmitted uplink subframe. The timing advance may therefore ensure that the downlink and uplink subframes are synchronized at the base station.

There are two types of Timing Advance command:
1. In the beginning, for example, at connection setup of a wireless device, an absolute timing parameter is communicated to the UE, for example, using MAC RAR element,
2. After connection setup, a relative timing correction may be transmitted to the UE. The relative timing correction may be used to update the absolute timing parameter. The relative timing correction may be transmitted using a MAC CE element. These relative timing corrections may be necessary because the UEs can move, or because of changes in multi-path propagation arising from a changing physical environment around the UEs.

From the absolute timing parameter and the relative timing corrections, it may be possible to calculate a propagation delay (PD), for example, by summing the parameters transmitted in the TA command sent in the RAR element, and all subsequent TA commands sent in CE elements, and dividing the result by two.

There currently exist certain challenge(s) in adapting TSN to wireless networks.

SUMMARY

Clock inaccuracy may be inherent to methods for relaying one or more clocks (e.g., external TSN clocks) via the 5G system to UEs supporting, for example, Industrial Internet of Things (IIoT) end devices, and may be a problem for TSN. The inaccuracy of concern may be a result of the radio frequency (RF) propagation delay that occurs when a base station (e.g., a gNB) transmits a network system clock time, i.e., a system time for the wireless network, as opposed to an external TSN clock time, over the radio interface within a message (e.g., a System Information block (SIB) or a Radio Resource Control (RRC) unicast message). In this circumstance, the propagation delay may need to be compensated for to ensure that the network system clock time value at the UE is as close as possible to the value of the network system clock time in the corresponding source node (e.g., a RAN node).

Disclosed herein are techniques for addressing the problem of clock inaccuracy/uncertainty inherent to methods for relaying the internal 5G system clock (i.e., the network system clock time) from a source node (e.g., a gNB with knowledge of the internal 5G system clock) in the 5G system to UEs, which may be supporting, for example, Industrial Internet of Things (IIoT) end devices.

Embodiments disclosed herein include an example method and/or procedure for aligning the sending of a network system clock time to a wireless device with the initiation of a propagation delay compensation procedure for the wireless device, according to various exemplary embodiments of the present disclosure. This exemplary method and/or procedure can be implemented, for example, in a network node (e.g., satellite, gateway, base station, etc.). As used herein, the term "network system clock" or "network system clock time" refers to a system time maintained by and within a wireless network, such as a 5G network, as distinct from a TSN clock time or other time reference external to the wireless network.

This example method includes the step of determining that a propagation delay compensation procedure for the wireless device is to be initiated or has been initiated. The illustrated method further includes the step of sending an indication of a network system clock time to the wireless device in association with the propagation delay compensation procedure.

Also disclosed herein is another exemplary method and/or procedure for aligning reception of a network system clock time with a propagation delay compensation procedure for a wireless device, where this method can be implemented, for example, in a UE (e.g., wireless device). This method includes the step of receiving an indication of a network system clock time from the network node, as well as the step of performing a propagation delay compensation procedure for the wireless device in association with receiving said indication.

Other exemplary embodiments include network nodes (e.g., base stations, or components thereof) and user equipment (UEs, e.g., wireless devices) configured to perform operations corresponding to any of the exemplary methods and/or procedures described herein. Other exemplary embodiments include non-transitory, computer-readable media storing program instructions that, when executed by processing circuitry, configure such network nodes or wireless devices, e.g. UEs, to perform operations corresponding to any of the exemplary methods and/or procedures described herein.

These and other objects, features and advantages of the present disclosure will become apparent upon reading the following Detailed Description in view of the Drawings briefly described below.

BRIEF DESCRIPTION OF THE FIGURES

FIG. 11-14 are flow diagrams illustrating various exemplary methods and/or procedures implemented in a communication system, according to various exemplary embodiments of the present disclosure.

DETAILED DESCRIPTION

Figure 1:
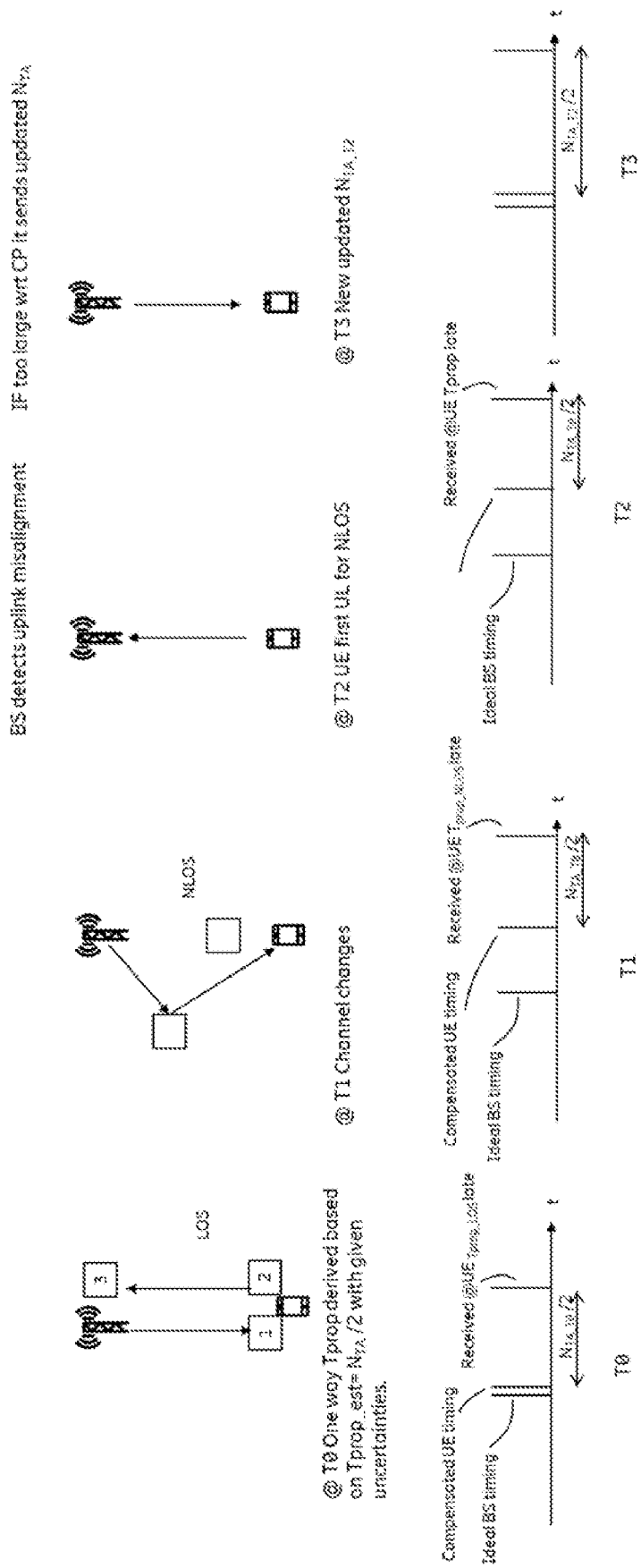
FIG. 1 illustrates a timing advance procedure (TA) and associated delays.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Disclosed herein are techniques for addressing the problem of clock inaccuracy/uncertainty inherent to methods for relaying the internal 5G system clock from a source node in the 5G system to UEs, which may be supporting, for example, Industrial Internet of Things (IIoT) end devices. An inaccuracy of concern is the error introduced as a result of the RF propagation delay that occurs when a gNB transmits a 5G system clock (i.e., the internal 5G system clock) over the radio interface within a message (e.g., a system information block (SIB) or Radio Resource Control (RRC) unicast message). The propagation delay needs to be compensated to ensure the clock value received by the UE is as close as possible to the value of that clock in the corresponding source node (e.g., a gNB with knowledge of the 5G internal system clock). In other words, the better the accuracy of relaying the 5G system clock from the source node to the UE, the better the accuracy that will be realized when external TSN clocks are relayed from a TSN grandmaster (GM) node through the 5G system to UEs (and subsequently to TSN end-stations). Note that the "5G internal system clock" or similar wireless network system time references are referred to herein by the term "network system clock" or "network system clock time." The terms "network system clock" or "network system clock time" as used herein thus refer to a system time maintained by and within a wireless network, such as a 5G network, as distinct from a TSN clock time or other time reference external to the wireless network.

In a transfer of an external TSN clock:
  Ingress timestamping is performed when an external TSN clock is received by a 5G system and egress timestamping is performed when that TSN clock (relayed through the 5G system) arrives at UE.
  The difference between the two timestamps indicates the 5G residence time, i.e., the time spent by the messages transiting the 5G system, which must be used to adjust the value of the external TSN clock.
  The timestamping is based on the internal 5G system clock, and thus the accuracy of delivering this clock to a UE is improved by allowing the propagation delay experienced (when sending this clock from a gNB to a UE) to be more precisely determined.

An additional source of inaccuracy occurs as a result of subsequent UE distribution of the external TSN clock to end devices, e.g., IIoT. This distribution may be needed to enable time-sensitive networking (TSN) functionalities, e.g., Time-Aware Scheduling of IIoT device operations specific to the working domain (a specific factory area) associated with a given working clock.

In 3GPP networks, a Timing Advance command is utilized in cellular communication for uplink transmission synchronization. As noted above, it can be further classified as two types:
1. In the beginning, at connection setup, an absolute timing parameter is communicated to a UE using MAC RAR element,
2. After connection setup, a relative timing correction can be sent to a UE using MAC CE element (e.g., UEs can move or due to RF channel changes caused by the environment).

(See 3GPP TS 38.133.)

The downlink Propagation Delay (PD), can be estimated for a given UE by (a) first summing the TA value indicated by the RAR (random access response) and all subsequent TA values sent using the MAC CE control element and (b) taking some portion of the total TA value resulting from summation of all the TA values (e.g., 50% could be used assuming the downlink and uplink propagation delays are essentially the same).

The PD can be utilized to understand time synchronization dynamics, e.g., for accurately tracking the value of a 5G system clock at UE side relative to the value of that clock in some other network node.

Current procedures for sending a 5G system clock from a gNB to a UE include:
  SIB broadcasting, where a specific SIB message includes a value for the 5G system clock having a value that is relative to a specific point in the SFN structure (e.g., the end the last SFN used for sending system information).
  RRC unicast, where a dedicated RRC message is used to send a specific UE a value for the 5G system clock having a value that is relative to a specific point in the SFN structure (e.g., end of SFNx).

Ongoing work in Release 16 of the 3GPP specifications is described in 3GPP TS 38.331.
  A TA procedure is conventionally performed to determine the amount of timing advance the UE needs to apply to have its uplink transmissions received by the gNB within an acceptable tolerance in the time domain. The UE can track the total set of TA values it has been commanded to use within any given cell and use one-half of the resulting net TA value as the current PD being experienced on the downlink. In previous systems, the TA procedure is performed independently from when the gNB sends a SIB message or RRC unicast message containing a value for the 5G system clock. As a consequence, the UE has no choice but to assume that the PD delay it calculated as a result of the most recent TA procedure still applies when it receives a 5G system clock from the gNB. The larger the time period between when a TA procedure was last performed and when a UE receives a 5G system clock, the greater the potential for the PD value (used by the UE to adjust the value of a received 5G system clock) to be less accurate with respect to the actual PD being experienced by the UE at the point of receiving the 5G system clock.

This is especially the case since the existing 3GPP TA procedure is designed for a different level of accuracy and purpose, namely keeping uplink transmissions within a smaller fraction of the cyclic prefix (CP) of the OFDM symbols. As an example, for 15 kHz NR numerology with a CP of 4.7 us, the overall acceptable TA related error could be in the 1 us range. Although TSN requires an end to end maximum error in some cases of 1 us, the total uncertainty introduced over air interface for delivering 5GS time will need to be a smaller fraction of this, such as a few hundreds of ns.

Here it should be noted that the TSN end-to-end (e2e) requirement is valid independent of NR numerology and Sub Carrier Spacing (SCS), while acceptable TA related errors detailed in the 3GPP TS 38.133 specification scale and reduce at higher SCS (since CP gets smaller). However, it is at the larger cells for TSN where RF propagation compensation is essential, and those cells would operate at lower SCS.

The first indication of a channel change affecting TA, and thus the first time that the gNB would be aware that a TA modification is needed, is after a gNB first performs uplink transmission tracking for a UE on a new channel (e.g., at initial channel assignment). In addition to this uplink delay tracking, there will be further delays to measure, resulting in the gNB issuing a new TA command in the downlink (DL) to the UE. In the meantime, the UE is instructed to track timing of the new channel using an outdated TA setting, resulting in a timing mismatch. This can be seen in FIG. 1, which illustrates an existing timing advance (TA) procedure and the associated delays.

Still further delays can be introduced as well, since 3GPP TS 38.133 limits the maximum magnitude of timing change in one adjustment (called Tq) e.g., 352*Tc for 15 kHz SCS where Tc is ~0.51 ns i.e. a total 179 ns corresponding to a maximum one-way RF propagation change of 27 m. The specification allows an aggregated change of same mentioned magnitude (Tq) every 200 ms. This means it can take a long time to fully compensate and correct for a larger channel change (for regular access and uplink timing alignment, margins normally exist within CP for such delays).

Another essential parameter in 3GPP TS 38.133 that impacts the RF delay compensation accuracy is the UE transmission error Te. The Te is defined as the UE capability to track a downlink reference signal at the input of the UE (i.e., independent of the radio channel) and its ability from this to assign a correct uplink transmission timing. The Te is given as +/− window in the specification and can be as large as 768*Tc (~390 ns) for 15 kHz numerology. The standard does not specifically say how this Te error is distributed internally within the UE, i.e., between RX and TX paths, nor does it state anything regarding how it can change over time.

As an example, the special case in which equal and symmetric errors between internal RX and TX are assumed would cancel out, using the existing TA method (using NTA/2), since internal delays and errors could be seen as extension of RF channel delays. However, the longer time elapsed since last TA compensation, the more likely Te has changed and therefore the more risk of introducing larger delay compensation errors and uplink errors.

Techniques and apparatuses for improving the accuracies associated with time transfer from a network, such as a 5G network, to a wireless device, such as a UE, are described herein. According to some of these embodiments, a gNB (or other base station or radio access network node), upon determining that it should initiate a PD compensation procedure (e.g., TA procedure) for a given UE, includes 5G system clock information as new information within the same message it sends to provide the UE with updated TA information or in a message sent in close time proximity to when the TA procedure is performed. In both of these cases, then, the 5G system clock information is sent in association with the TA procedure or other PD compensation procedure.

In various embodiments, the triggering events used by a gNB for performing the PD compensation procedure can be based on, for example: (a) using a fixed periodicity to trigger the procedure (e.g., periodicity can be aligned with 5G system clock delivery, channel dynamics, traffic pattern) or (b) only triggering the procedure when the gNB detects that uplink sync departs from the nominal point of uplink sync detection by an amount that is smaller than that applicable to legacy operation (e.g., once triggered, the actual procedure can be deferred based on when 5G system clock delivery is performed, when channel dynamics exceed some threshold, when the type of traffic to be supported changes) or (c) a combination of (a) and (b).

Moreover, the wireless device, e.g., a 5G UE, can also estimate PD compensation error, e.g., by tracking synchronization/reference signals, and applying compensation method itself, if compensation methods are not triggered or initiated by gNB.

These approaches help to ensure that the downlink PD value the UE determines to be applicable as a result of performing the TA procedure (e.g., downlink PD=½ of the total TA it is applying for its current cell) is a good indication of the actual PD it is currently experiencing, and it can therefore use this PD value to realize a more accurate adjustment of the 5G system clock value it receives from the gNB.

In some embodiments, the actual TA procedure can be expected to have a finer granularity (compared to previously existing procedures) for the TA adjustments provided to a UE, to help reduce the uncertainty associated with the indicated TA and thereby reduce the uncertainty introduced when a UE adjusts a received 5G system clock value to reflect the downlink propagation delay. In other words, the legacy TA procedure can be enhanced to provide UEs with TA values that reflect the smallest variations in uplink sync that a gNB implementation can be realistically be expected to detect. It is also feasible to expect a gNB to only perform an enhanced version of the TA procedure with UEs that it knows have an enhanced ability to perform downlink tracking and uplink alignment, as this will result in the gNB generating TA values that more accurately reflect actual downlink delay experienced by UEs at the point of performing the TA procedure. Other embodiments are possible where the TA procedure and the 5G system clock delivery are performed as close in time as possible but are not necessarily performed simultaneously. Once again, it will be appreciated that in either case, the 5G system clock delivery is associated with the TA procedure, in that the 5G system clock delivery is performed because of the TA procedure or the TA procedure is performed because of the 5G system clock delivery.

An advantage of using wireless technology in part of the TSN networks is that it allows mobility and more flexible usage. Considering that the distribution of accurate timing through wired cables in existing networks has far less dynamic variation in channel delays than can be expected in wireless networks, handling RF channel variations is key for accurate timing deliveries in wireless networks.

The techniques described herein focus on enhancement of time signaling protocols reducing effect of RF channel variations. The protocols can be legacy TA or its advanced counterparts. The solutions allow the UE to determine a downlink PD value that is closer to the actual PD value it experiences at the point of receiving the 5G system clock and thereby realize a more accurate adjustment of the 5G system clock. This then allows for more accurate egress timestamping (could be ingress time stamp if UE is delivering the TSN grandmaster (GM) clock to the 5G core network for subsequent distribution to end stations reachable through a TSN network) to be performed by a UE, thereby allowing for more accurate determination of 5G system residence times experienced when relaying external TSN clocks through the 5G system, and therefore allowing for more accurate values for the external TSN clocks to be identified by the UE and/or its corresponding end-stations.

It is expected that decoupling of UE RX tracking counters and 5GS time counters will be supported, so that the latter will not be affected by phase jumps caused by channel changes that may occur between periodic 5GS clock deliveries. The frequency of the 5GS counter keeping time between 5GS timing deliveries can be assumed stable to within the required UE RF frequency accuracy of 100 ppb relative to the accurate gNB frequency. The counter can adjust its frequency based on historical received 5GS timing events (5G clock deliveries).

Below are described several embodiments that can be used alone, or in combination with one another or other techniques, to compensate PD estimations in a cell. For ease of discussion, a TA procedure, as described above, is discussed in detail as one of the PD compensation methods. However, the techniques described herein are not limited to just using the TA procedure as currently defined. The invention and the embodiments can be applied to PD compensation methods that are based on, e.g.:
  1. Legacy TA procedure, or
  2. Advanced (new or modified) TA procedure, or
  3. Any known or new PD compensation method (non-TA based).

Various embodiments consider PD compensation application in reference to clock delivery/information. One example of the clock is the 5G System (5GS) clock.

Further, in the discussion herein, by "TA" or the "TA procedure/method" is meant the procedure, including the full set of signaling messages, required for a gNB and/or UE to arrive at a PD compensation value, comprising:
  1. DL reference signal,
  2. UL reference signal,
  3. Compensation reporting signal.

Well-known reference signals include demodulation reference signals (DMRS), positioning reference signals (PRS), cell-specific reference signals (CRS), channel-state information reference signals (CSI-RS), phase-tracking reference signals (PTRS), and sounding reference signals (SRS). It will be appreciated that the principles of the TA procedure or PD compensation more generally do not depend on the type of reference signal that is used.

Figure 2:
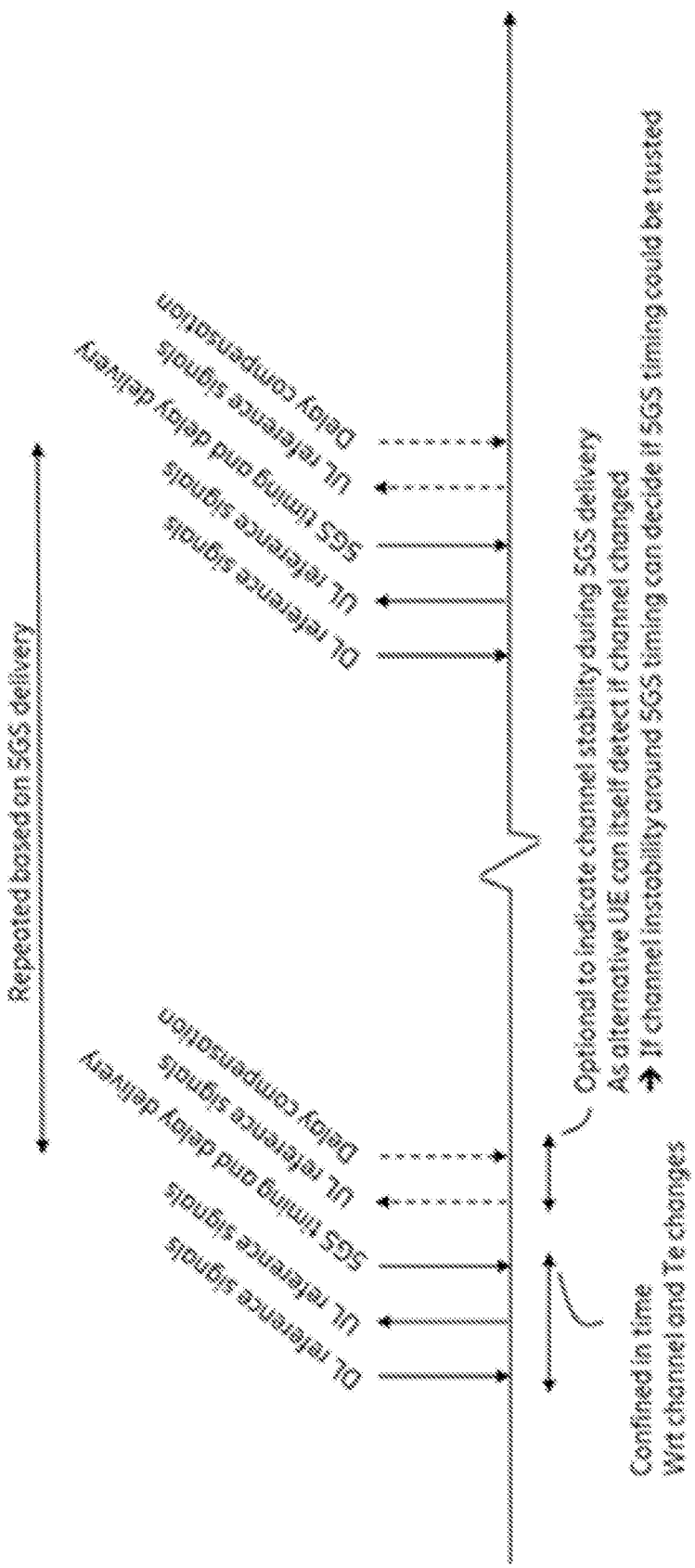
FIG. 2 illustrates a propagation delay compensation procedure in close time proximity with clock delivery.

The signaling can be performed in close time proximity to clock delivery, where the clock information may or may not be combined with any of the signaling used to perform the PD compensation. For example, clock information can be transmitted in a DL reference signal, or in a compensation reporting signal. An example is shown in FIG. 2, where PD compensation procedure is done in close time proximity with clock delivery. This figure shows a PD compensation procedure with signaling set—DL, UL reference signals, and compensation reporting signal—done in close time proximity with clock delivery.

1. In some embodiments, the UE should perform TA procedure (or some variation thereof by which the gNB can arrive at a value for the applicable downlink propagation delay) when it receives an indication of the clock (e.g., 5G System clock). The TA can be performed
   a. before clock reception at UE, or
   b. after clock reception at UE, or
   c. both before and after clock reception at UE, or
   d. simultaneous with clock reception at UE.
2. In some embodiments, in addition to legacy TA procedures, TA can be performed if
   a. clock (e.g., 5GS clock) reception is triggered, or
   b. substantial channel dynamics are witnessed by UE or gNB,
      i. For example, if UE witnesses substantial channel dynamics, e.g., changes in signal conditions exceeding a predetermined threshold, it may send TA request.
      ii. gNB can also trigger TA procedure, if it senses substantial channel variation, or changes carrier transmission, or does beam switching, etc.
3. In some embodiments, the TA procedure can be triggered by clock transmission, or clock transmission can be triggered by TA procedure.
4. In some embodiments, the periodicity of TA procedure can be kept
   a. static,
      i. where TA is performed at every fixed time interval,
         1. E.g., aligned with 5GS clock delivery
   b. dynamic,
      i. where TA is performed when channel dynamics appear to be substantially changed
      ii. where TA is performed when carrier is switched,
      iii. where TA is performed when beam is switched,
      iv. where TA is performed when numerology (SCS) is changed,
      v. where TA is performed when clock is received,
      vi. where TA is performed when timing error Te is sensed drifted,
   c. any combination of a and b.
5. In some embodiments, the clock (e.g., 5G System clock) information transmission can be done in an
   a. RRC unicast manner, or
   b. RRC multicast manner, or
   c. RRC broadcast manner.
6. In some embodiments, UE can analyze DL transmission timing changes and can apply TA compensation autonomously without triggering TA procedure,
   For example, UE can monitor reference signals (e.g., DMRS synchronization signals), and monitor the DL timing, and if the UE witnesses the relative DL timing variation (by analyzing the recent history), UE can estimate a change in delay compensation.

Figure 3:
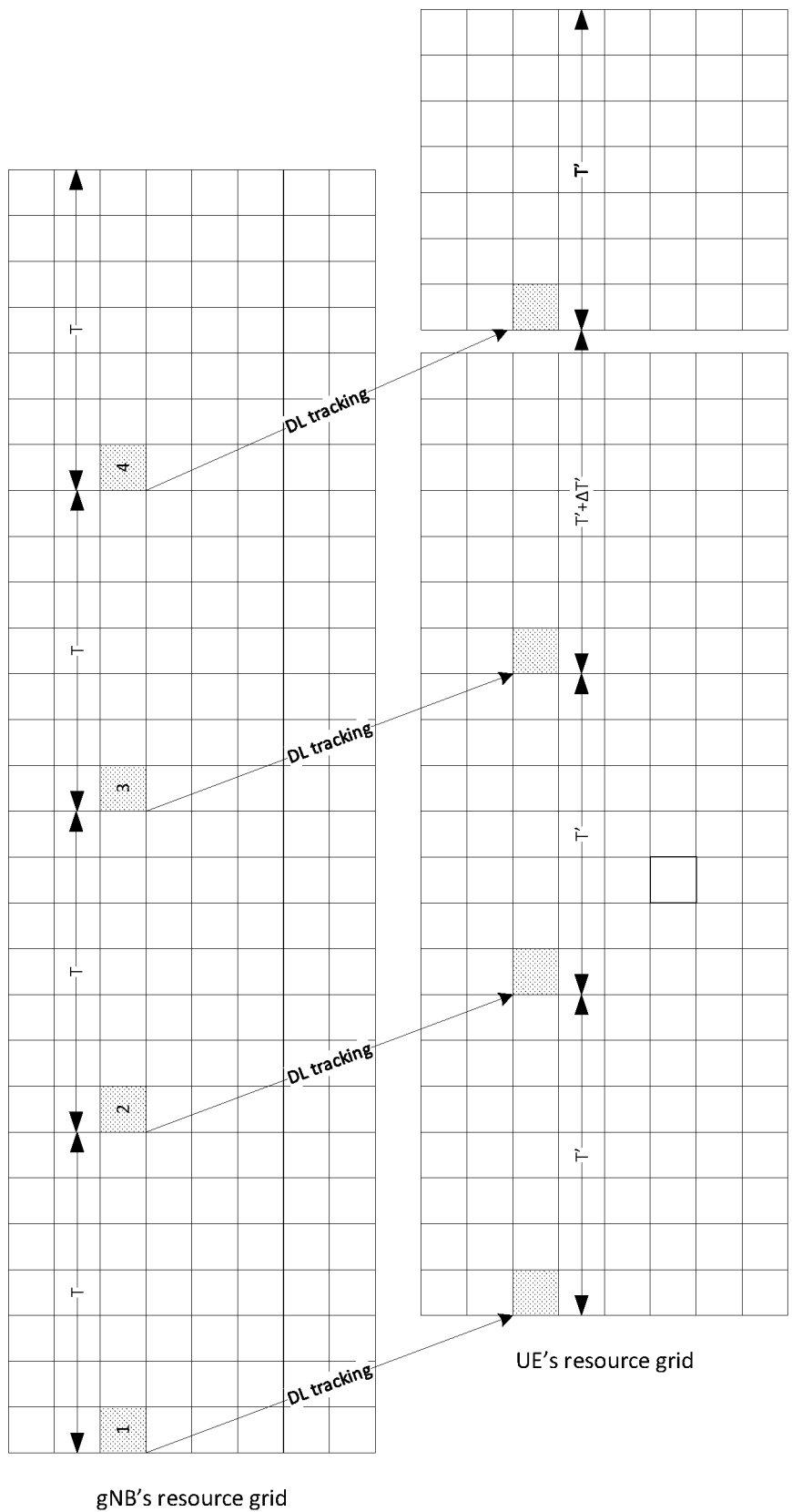
FIG. 3 illustrates downlink (DL) timing tracking by a UE.

In FIG. 3, UE knows the pattern of synchronization signals (SSBs), and when UE tracks these SSBs, the tracking may or may not have definitive/expected pattern in the time domain due to channel dynamics.

For example, in FIG. 3, which illustrates downlink (DL) timing tracking by a UE, tracking time has increased suddenly with respect to previous tracking occasions and UE can estimate this increase in PD (due to changes in the downlink propagation path of the channel or UE DL tracking error or both), which is shown in the figure as ΔT'.

The UE can the double the value it detected for the increase in PD, i.e., two times ΔT', to obtain $TA_{delta}$, and then auto-adjust its uplink transmissions according to $TA_{delta}$.

A key objective of various of the techniques described herein is that of identifying how to perform the TA procedure and the procedures for 5G system clock delivery as close as possible in time proximity:

The gNB can detect when a UE needs to be supported using an enhanced TA procedure, e.g., as a result of the RRC signaling performed when a UE first enters the RRC_Connected mode. For example, the RRCSetupRequest message sent by a UE to gNB to trigger UE entry into RRC_Connected mode could be enhanced to include a new indicator, indicating that the UE supports an enhanced TA procedure. This then allows a gNB to use enhanced TA when it determines that such a UE supports TSN end stations that require 1us uncertainty for its TSN clocks.

The gNB performs the TA procedure periodically or whenever it the detects UL SFN transmissions from a given UE are being received with unacceptable accuracy with respect to their nominal window of reception.

The downlink PD value the UE determines to be applicable as a result of performing the TA procedure (e.g., downlink PD=½ of the total TA it is applying for its current cell) is a good indication of the actual PD it is currently experiencing assuming symmetric DL and UL propagation delays and similar for Te values at the UE (DL) and the gNB (UL).

The 5G system clock delivery procedure involves the gNB periodically sending a 5G clock value that is applicable to a specific point in the SFN frames structure (e.g., at the end of DL SFN X) using SIB based or RRC unicast based methods.

The closer the 5G system clock delivery procedure is to when downlink PD value was last determined by the UE (i.e. during the most recent TA procedure) the more accurate that PD value will be and therefore the more accurate the adjustment of the 5G system clock will be. This then allows for more accurate egress timestamping (or ingress if UE is distributing TSN GM clock to the 5G core network for subsequent distribution to end stations reachable through a TSN network) to be performed by a UE, thereby allowing for more accurate determination of 5G system residence times experienced when relaying external TSN clocks through the 5G system.

The more accurate the 5G residence time can be measured the more accurate the values for the external TSN clocks received by the UE (and/or its corresponding end-stations) can be established (i.e. the external TSN clocks values must be adjusted to reflect 5G system residence time).

The key points at which a gNB normally (per legacy operation) determines it is necessary to perform the TA procedure (e.g., when a UE enters RRC Connected state) can serve as convenient instances of RRC signaling for which to include the value of the 5G system clock and they allow for the 5G clock to be adjusted to reflect the actual PD applicable at the point of receiving the 5G clock.

For scenarios where a UE establishes a value for an external TSN clock it can be expected to maintain it with acceptable accuracy during the time period between refreshes of that TSN clock (i.e. the same oscillator used for maintaining the value of the internal 5G system clock between refreshes thereof can be used for maintaining the value of an external TSN clock). Otherwise, if the UE does not need real time knowledge of an external TSN clock it only maintains the internal 5G system clock between receiving refreshes for that 5G clock (i.e. in this case end-stations are responsible for maintaining a sufficiently accurate value for an external TSN clock between receiving refreshes for that TSN clock).

These embodiments described above can be further illustrated with reference to FIGS. 4 and 5, which depict exemplary methods and/or procedures performed by a wireless device, e.g. a UE and a network node, e.g. a radio network node, respectively. In other words, various features of the operations described below, with reference to FIGS. 4 and 5, correspond to various embodiments described above.

Figure 4:
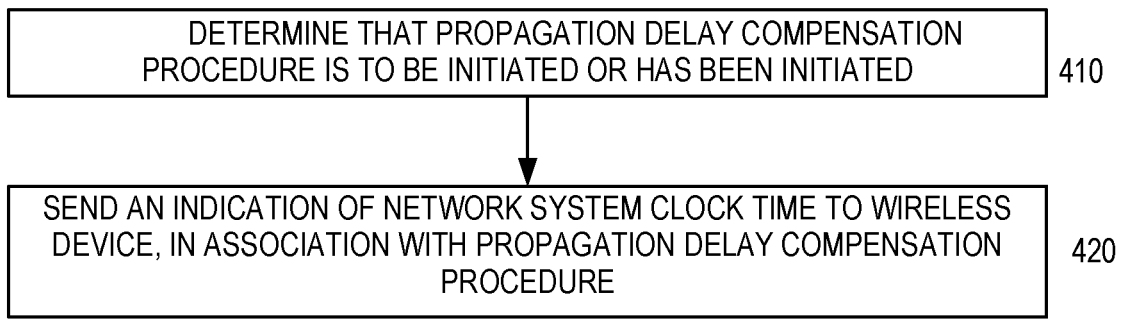
FIG. 4 is a flow diagram illustrating an exemplary method and/or procedure performed by a network node, according to various exemplary embodiments of the present disclosure.

More specifically, FIG. 4 is a flow diagram illustrating an exemplary method and/or procedure for aligning sending of a network system clock time to a wireless device with initiating a propagation delay compensation procedure for the wireless device, according to various exemplary embodiments of the present disclosure. The exemplary method and/or procedure shown in FIG. 4 can be implemented, for example, in a network node (e.g., satellite, gateway, base station, etc.) described in relation to other figures herein. The exemplary method and/or procedure shown in FIG. 4 can also be used cooperatively with other exemplary methods and/or procedure described herein (e.g., FIG. 5) to provide various benefits, advantages, and/or solutions described herein. Although FIG. 4 shows specific blocks in a particular order, the operations of the exemplary method and/or procedure can be performed in a different order than shown and can be combined and/or divided into blocks having different functionality than shown. Optional blocks or operations are indicated by dashed lines.

The method illustrated in FIG. 4 includes the step of determining that a propagation delay compensation procedure for the wireless device is to be initiated or has been initiated, as shown at block 410. The illustrated method further includes the step of sending an indication of a network system clock time to the wireless device in association with the propagation delay compensation procedure, as shown in block 420. By "in association with" is meant that the sending of the indication of the network system clock time is triggered because of the propagation delay compensation procedure, or the propagation delay compensation procedure is triggered because of the sending of the indication of the network system clock time. It can thus be expected that the sending of the indication of the network system clock time is in close proximity to the performing of the propagation delay compensation procedure, e.g., shortly before the procedure, shortly after the procedure, or simultaneously with or during the procedure. Thus, in some embodiments, the method comprises performing the propagation delay compensation procedure and providing the indication of the network system clock time in signaling used to perform the propagation delay compensation procedure or in signaling sent along with signaling of the propagation delay compensation procedure.

In some embodiments, the determining shown in block 410 may be based on one or both of the following: a periodic indication that the propagation delay compensation procedure is to be initiated; and detecting that uplink synchronization for the wireless device deviates from a nominal synchronization level by at least a predetermined amount.

In some embodiments, the propagation delay compensation procedure is triggered by a determination that network system clock time is to be sent to the wireless device. As discussed above, the propagation delay compensation procedure may comprise a timing advance (TA) procedure, in some embodiments. More generally, the propagation delay compensation procedure may be based on measurements of both uplink reference signals and downlink reference signals, as described above. In some embodiments, the method further comprises determining that the wireless device is able to receive enhanced timing advance values, the enhanced timing advance values reflecting smaller variations in uplink synchronization than provided to wireless devices unable to receive enhanced timing advance values, and providing the wireless device with an enhanced timing advance value as part of the timing advance procedure.

In some embodiments, the indication of the network system clock time is sent in a Radio Resource Configuration (RRC) message and the method comprises performing the propagation delay compensation procedure in association with sending the RRC message. In some embodiments, the network system clock time is a 5G network system time, which may be or may be synchronized with a TSN network time.

Figure 5:
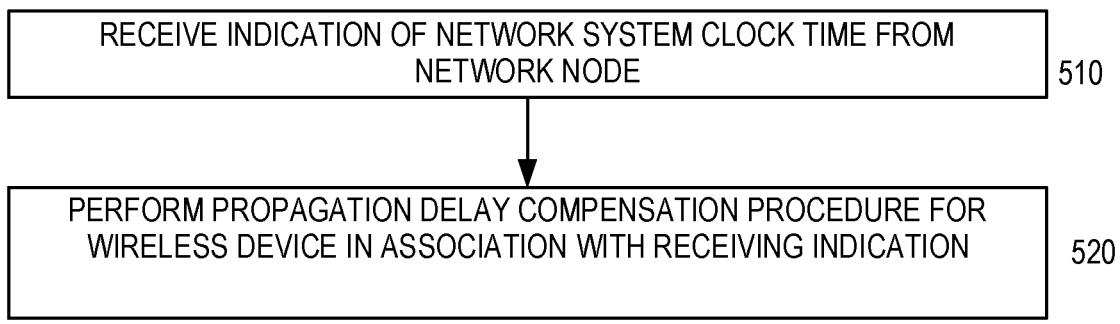
FIG. 5 is a flow diagram illustrating an exemplary method and/or procedure performed by a wireless device, according to various exemplary embodiments of the present disclosure.

FIG. 5 is a flow diagram illustrating an exemplary method and/or procedure for aligning reception of a network system clock with initiating a propagation delay compensation procedure for a wireless device, according to various exemplary embodiments of the present disclosure. The exemplary method and/or procedure shown in FIG. 5 can be implemented, for example, in a UE (e.g., wireless device) such as described in relation to other figures herein. The exemplary method and/or procedure shown in FIG. 5 can also be used cooperatively with other exemplary methods and/or procedures described herein (e.g., FIG. 4) to provide various benefits, advantages, and/or solutions described herein. Although FIG. 5 shows specific blocks in a particular order, the operations of the exemplary method and/or procedure can be performed in a different order than shown and can be combined and/or divided into blocks having different functionality than shown. Optional operations are indicated by dashed lines.

The method illustrated in FIG. 5 includes the step of receiving an indication of a network system clock time from the network node, as shown at block 510. The method further comprises the step of performing a propagation delay compensation procedure for the wireless device in association with receiving said indication, as shown at block 520. This propagation delay compensation procedure may be based, for example, on measurements of both uplink reference signals (by a network node) and downlink reference signals (by the wireless device).

In some embodiments, the method comprises: detecting a change in channel conditions that affects timing; triggering the propagation delay compensation procedure in response to said detecting; and receiving the indication of the network system clock time in signaling used to perform the propagation delay compensation procedure or in signaling sent along with performing the propagation delay compensation procedure.

In some embodiments, the propagation delay compensation procedure is triggered by a determination that network system clock time has been sent or is to be sent to the wireless device.

In any of these embodiments, the propagation delay compensation procedure may comprise a timing advance procedure. In some of these embodiments, the method may further comprise receiving an enhanced timing advance value as part of the timing advance procedure, the enhanced timing advance value reflecting smaller variations in uplink synchronization than provided to wireless devices unable to receive enhanced timing advance values.

In some embodiments, the propagation delay compensation procedure may comprise timing advance compensation performed autonomously by the wireless device. This may comprise, for example, monitoring one or more reference signals and/or synchronization signals and adjusting timing advance in response to detected variations in timing for the reference signals and/or synchronization signals.

In various embodiments, the indication of the network system clock may be received in a RRC message, where the method comprises performing the propagation delay compensation procedure in association with receiving the RRC message.

In some embodiments, the network system clock time is a 5G network system time. It should be appreciated, of course, that the techniques described herein may be applicable to other networks and thus other network system times.

Figure 6:
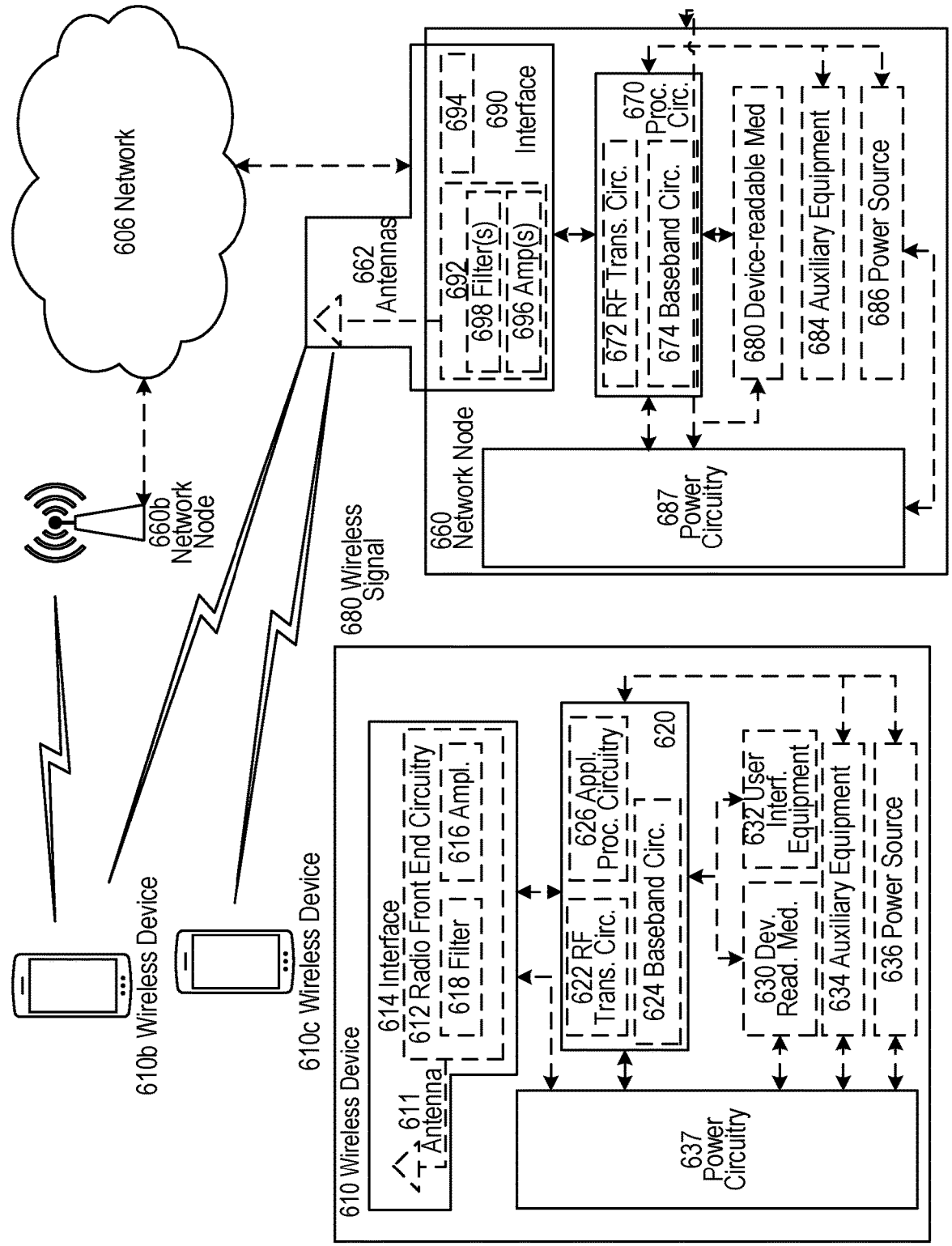
FIG. 6 is a block diagram of an exemplary wireless network configurable according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 6. For simplicity, the wireless network of FIG. 6 only depicts network 606, network nodes 660 and 660b, and WDs 610, 610b, and 610c. In practice, a wireless network can further include any additional elements suitable to support communication between wireless devices or between a wireless device and another communication device, such as a landline telephone, a service provider, or any other network node or end device. Of the illustrated components, network node 660 and wireless device (WD) 610 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 602.11 standards; and/or any other appropriate wireless communication standard, such as the Worldwide Interoperability for Microwave Access (WiMax), Bluetooth, Z-Wave and/or ZigBee standards.

Network 606 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 660 and WD 610 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 6, network node 660 includes processing circuitry 670, device readable medium 680, interface 690, auxiliary equipment 684, power source 686, power circuitry 687, and antenna 662. Although network node 660 illustrated in the example wireless network of FIG. 6 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 660 are depicted as single boxes located within a larger box, or nested within multiple boxes, in practice, a network node can comprise multiple different physical components that make up a single illustrated component (e.g., device readable medium 680 can comprise multiple separate hard drives as well as multiple RAM modules).

Similarly, network node 660 can be composed of multiple physically separate components (e.g., a NodeB component and a RNC component, or a BTS component and a BSC component, etc.), which can each have their own respective components. In certain scenarios in which network node 660 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 660 can be configured to support multiple radio access technologies (RATs). In such embodiments, some components can be duplicated (e.g., separate device readable medium 680 for the different RATs) and some components can be reused (e.g., the same antenna 662 can be shared by the RATs). Network node 660 can also include multiple sets of the various illustrated components for different wireless technologies integrated into network node 660, such as, for example, GSM, WCDMA, LTE, NR, WiFi, or Bluetooth wireless technologies. These wireless technologies can be integrated into the same or different chip or set of chips and other components within network node 660.

Processing circuitry 670 can be configured to perform any determining, calculating, or similar operations (e.g., certain obtaining operations) described herein as being provided by a network node. These operations performed by processing circuitry 670 can include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 can execute instructions stored in device readable medium 680 or in memory within processing circuitry 670. Such functionality can include providing any of the various wireless features, functions, or benefits discussed herein. In some embodiments, processing circuitry 670 can include a system on a chip (SOC).

In some embodiments, processing circuitry 670 can include one or more of radio frequency (RF) transceiver circuitry 672 and baseband processing circuitry 674. In some embodiments, radio frequency (RF) transceiver circuitry 672 and baseband processing circuitry 674 can be on separate chips (or sets of chips), boards, or units, such as radio units and digital units. In alternative embodiments, part or all of RF transceiver circuitry 672 and baseband processing circuitry 674 can be on the same chip or set of chips, boards, or units In certain embodiments, some or all of the functionality described herein as being provided by a network node, base station, eNB or other such network device can be performed by processing circuitry 670 executing instructions stored on device readable medium 680 or memory within processing circuitry 670. In alternative embodiments, some or all of the functionality can be provided by processing circuitry 670 without executing instructions stored on a separate or discrete device readable medium, such as in a hard-wired manner. In any of those embodiments, whether executing instructions stored on a device readable storage medium or not, processing circuitry 670 can be configured to perform the described functionality. The benefits provided by such functionality are not limited to processing circuitry 670 alone or to other components of network node 660, but are enjoyed by network node 660 as a whole, and/or by end users and the wireless network generally.

Device readable medium 680 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 670. Device readable medium 680 can store any suitable instructions, data or information, including a computer program, software, an application including one or more of logic, rules, code, tables, etc. and/or other instructions capable of being executed by processing circuitry 670 and, utilized by network node 660. Device readable medium 680 can be used to store any calculations made by processing circuitry 670 and/or any data received via interface 690. In some embodiments, processing circuitry 670 and device readable medium 680 can be considered to be integrated.

Interface 690 is used in the wired or wireless communication of signalling and/or data between network node 660, network 606, and/or WDs 610. As illustrated, interface 690 comprises port(s)/terminal(s) 694 to send and receive data, for example to and from network 606 over a wired connection. Interface 690 also includes radio front end circuitry 692 that can be coupled to, or in certain embodiments a part of, antenna 662. Radio front end circuitry 692 comprises filters 698 and amplifiers 696. Radio front end circuitry 692 can be connected to antenna 662 and processing circuitry 670. Radio front end circuitry can be configured to condition signals communicated between antenna 662 and processing circuitry 670. Radio front end circuitry 692 can receive digital data that is to be sent out to other network nodes or WDs via a wireless connection. Radio front end circuitry 692 can convert the digital data into a radio signal having the appropriate channel and bandwidth parameters using a combination of filters 698 and/or amplifiers 696. The radio signal can then be transmitted via antenna 662. Similarly, when receiving data, antenna 662 can collect radio signals which are then converted into digital data by radio front end circuitry 692. The digital data can be passed to processing circuitry 670. In other embodiments, the interface can comprise different components and/or different combinations of components.

In certain alternative embodiments, network node 660 may not include separate radio front end circuitry 692, instead, processing circuitry 670 can comprise radio front end circuitry and can be connected to antenna 662 without separate radio front end circuitry 692. Similarly, in some embodiments, all or some of RF transceiver circuitry 672 can be considered a part of interface 690. In still other embodiments, interface 690 can include one or more ports or terminals 694, radio front end circuitry 692, and RF transceiver circuitry 672, as part of a radio unit (not shown), and interface 690 can communicate with baseband processing circuitry 674, which is part of a digital unit (not shown).

Antenna 662 can include one or more antennas, or antenna arrays, configured to send and/or receive wireless signals. Antenna 662 can be coupled to radio front end circuitry 690 and can be any type of antenna capable of transmitting and receiving data and/or signals wirelessly. In some embodiments, antenna 662 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 662 can be separate from network node 660 and can be connectable to network node 660 through an interface or port.

Antenna 662, interface 690, and/or processing circuitry 670 can be configured to perform any receiving operations and/or certain obtaining operations described herein as being performed by a network node. Any information, data and/or signals can be received from a wireless device, another network node and/or any other network equipment. Similarly, antenna 662, interface 690, and/or processing circuitry 670 can be configured to perform any transmitting operations described herein as being performed by a network node. Any information, data and/or signals can be transmitted to a wireless device, another network node and/or any other network equipment.

Power circuitry 687 can comprise, or be coupled to, power management circuitry and can be configured to supply the components of network node 660 with power for performing the functionality described herein. Power circuitry 687 can receive power from power source 686. Power source 686 and/or power circuitry 687 can be configured to provide power to the various components of network node 660 in a form suitable for the respective components (e.g., at a voltage and current level needed for each respective component). Power source 686 can either be included in, or external to, power circuitry 687 and/or network node 660. For example, network node 660 can be connectable to an external power source (e.g., an electricity outlet) via an input circuitry or interface such as an electrical cable, whereby the external power source supplies power to power circuitry 687. As a further example, power source 686 can comprise a source of power in the form of a battery or battery pack which is connected to, or integrated in, power circuitry 687. The battery can provide backup power should the external power source fail. Other types of power sources, such as photovoltaic devices, can also be used.

Alternative embodiments of network node 660 can include additional components beyond those shown in FIG. 6 that can be responsible for providing certain aspects of the network node's functionality, including any of the functionality described herein and/or any functionality necessary to support the subject matter described herein. For example, network node 660 can include user interface equipment to allow and/or facilitate input of information into network node 660 and to allow and/or facilitate output of information from network node 660. This can allow and/or facilitate a user to perform diagnostic, maintenance, repair, and other administrative functions for network node 660.

In some embodiments, a wireless device (WD, e.g., WD 610) can be configured to communicate wirelessly with network nodes (e.g., 660) and/or other wireless devices (e.g., 610*b,c*). Communicating wirelessly can involve transmitting and/or receiving wireless signals using electromagnetic waves, radio waves, infrared waves, and/or other types of signals suitable for conveying information through air. In some embodiments, a WD can be configured to transmit and/or receive information without direct human interaction. For instance, a WD can be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow-band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 610 includes antenna 611, interface 614, processing circuitry 620, device readable medium 630, user interface equipment 632, auxiliary equipment 634, power source 636 and power circuitry 637. WD 610 can include multiple sets of one or more of the illustrated components for different wireless technologies supported by WD 610, such as, for example, GSM, WCDMA, LTE, NR, WiFi, WiMAX, or Bluetooth wireless technologies, just to mention a few. These wireless technologies can be integrated into the same or different chips or set of chips as other components within WD 610.

Antenna 611 can include one or more antennas or antenna arrays, configured to send and/or receive wireless signals, and is connected to interface 614. In certain alternative embodiments, antenna 611 can be separate from WD 610 and be connectable to WD 610 through an interface or port. Antenna 611, interface 614, and/or processing circuitry 620 can be configured to perform any receiving or transmitting operations described herein as being performed by a WD. Any information, data and/or signals can be received from a network node and/or another WD. In some embodiments, radio front end circuitry and/or antenna 611 can be considered an interface.

As illustrated, interface 614 comprises radio front end circuitry 612 and antenna 611. Radio front end circuitry 612 comprise one or more filters 618 and amplifiers 616. Radio front end circuitry 614 is connected to antenna 611 and processing circuitry 620, and can be configured to condition signals communicated between antenna 611 and processing circuitry 620. Radio front end circuitry 612 can be coupled to or a part of antenna 611. In some embodiments, WD 610 may not include separate radio front end circuitry 612; rather, processing circuitry 620 can comprise radio front end circuitry and can be connected to antenna 611. Similarly, in some embodiments, some or all of RF transceiver circuitry 622 can be considered a part of interface 614. Radio front end circuitry 612 can receive digital data that is to be sent out to other network nodes or WDs via a wireless connection. Radio front end circuitry 612 can convert the digital data into a radio signal having the appropriate channel and bandwidth parameters using a combination of filters 618 and/or amplifiers 616. The radio signal can then be transmitted via antenna 611. Similarly, when receiving data, antenna 611 can collect radio signals which are then converted into digital data by radio front end circuitry 612. The digital data can be passed to processing circuitry 620. In other embodiments, the interface can comprise different components and/or different combinations of components.

Processing circuitry 620 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 610 components, such as device readable medium 630, WD 610 functionality. Such functionality can include providing any of the various wireless features or benefits discussed herein. For example, processing circuitry 620 can execute instructions stored in device readable medium 630 or in memory within processing circuitry 620 to provide the functionality disclosed herein.

As illustrated, processing circuitry 620 includes one or more of RF transceiver circuitry 622, baseband processing circuitry 624, and application processing circuitry 626. In other embodiments, the processing circuitry can comprise different components and/or different combinations of components. In certain embodiments processing circuitry 620 of WD 610 can comprise a SOC. In some embodiments, RF transceiver circuitry 622, baseband processing circuitry 624, and application processing circuitry 626 can be on separate chips or sets of chips. In alternative embodiments, part or all of baseband processing circuitry 624 and application processing circuitry 626 can be combined into one chip or set of chips, and RF transceiver circuitry 622 can be on a separate chip or set of chips. In still alternative embodiments, part or all of RF transceiver circuitry 622 and baseband processing circuitry 624 can be on the same chip or set of chips, and application processing circuitry 626 can be on a separate chip or set of chips. In yet other alternative embodiments, part or all of RF transceiver circuitry 622, baseband processing circuitry 624, and application processing circuitry 626 can be combined in the same chip or set of chips. In some embodiments, RF transceiver circuitry 622 can be a part of interface 614. RF transceiver circuitry 622 can condition RF signals for processing circuitry 620. In certain embodiments, some or all of the functionality described herein as being performed by a WD can be provided by processing circuitry 620 executing instructions stored on device readable medium 630, which in certain embodiments can be a computer-readable storage medium. In alternative embodiments, some or all of the functionality can be provided by processing circuitry 620 without executing instructions stored on a separate or discrete device readable storage medium, such as in a hard-wired manner. In any of those particular embodiments, whether executing instructions stored on a device readable storage medium or not, processing circuitry 620 can be configured to perform the described functionality. The benefits provided by such functionality are not limited to processing circuitry 620 alone or to other components of WD 610, but are enjoyed by WD 610 as a whole, and/or by end users and the wireless network generally.

Processing circuitry 620 can be configured to perform any determining, calculating, or similar operations (e.g., certain obtaining operations) described herein as being performed by a WD. These operations, as performed by processing circuitry 620, can include processing information obtained by processing circuitry 620 by, for example, converting the obtained information into other information, comparing the obtained information or converted information to information stored by WD 610, and/or performing one or more operations based on the obtained information or converted information, and as a result of said processing making a determination.

Device readable medium 630 can be operable to store a computer program, software, an application including one or more of logic, rules, code, tables, etc. and/or other instructions capable of being executed by processing circuitry 620. Device readable medium 630 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 620. In some embodiments, processing circuitry 620 and device readable medium 630 can be considered to be integrated.

User interface equipment 632 can include components that allow and/or facilitate a human user to interact with WD 610. Such interaction can be of many forms, such as visual, audial, tactile, etc. User interface equipment 632 can be operable to produce output to the user and to allow and/or facilitate the user to provide input to WD 610. The type of interaction can vary depending on the type of user interface equipment 632 installed in WD 610. For example, if WD 610 is a smart phone, the interaction can be via a touch screen; if WD 610 is a smart meter, the interaction can be through a screen that provides usage (e.g., the number of gallons used) or a speaker that provides an audible alert (e.g., if smoke is detected). User interface equipment 632 can include input interfaces, devices and circuits, and output interfaces, devices and circuits. User interface equipment 632 can be configured to allow and/or facilitate input of information into WD 610 and is connected to processing circuitry 620 to allow and/or facilitate processing circuitry 620 to process the input information. User interface equipment 632 can include, for example, a microphone, a proximity or other sensor, keys/buttons, a touch display, one or more cameras, a USB port, or other input circuitry. User interface equipment 632 is also configured to allow and/or facilitate output of information from WD 610, and to allow and/or facilitate processing circuitry 620 to output information from WD 610. User interface equipment 632 can include, for example, a speaker, a display, vibrating circuitry, a USB port, a headphone interface, or other output circuitry. Using one or more input and output interfaces, devices, and circuits, of user interface equipment 632, WD 610 can communicate with end users and/or the wireless network and allow and/or facilitate them to benefit from the functionality described herein.

Auxiliary equipment 634 is operable to provide more specific functionality which may not be generally performed by WDs. This can comprise specialized sensors for doing measurements for various purposes, interfaces for additional types of communication such as wired communications etc. The inclusion and type of components of auxiliary equipment 634 can vary depending on the embodiment and/or scenario.

Power source 636 can, in some embodiments, be in the form of a battery or battery pack. Other types of power sources, such as an external power source (e.g., an electricity outlet), photovoltaic devices or power cells, can also be used. WD 610 can further comprise power circuitry 637 for delivering power from power source 636 to the various parts of WD 610 which need power from power source 636 to carry out any functionality described or indicated herein. Power circuitry 637 can in certain embodiments comprise power management circuitry. Power circuitry 637 can additionally or alternatively be operable to receive power from an external power source; in which case WD 610 can be connectable to the external power source (such as an electricity outlet) via input circuitry or an interface such as an electrical power cable. Power circuitry 637 can also in certain embodiments be operable to deliver power from an external power source to power source 636. This can be, for example, for the charging of power source 636. Power circuitry 637 can perform any converting or other modification to the power from power source 636 to make it suitable for supply to the respective components of WD 610.

Figure 7:
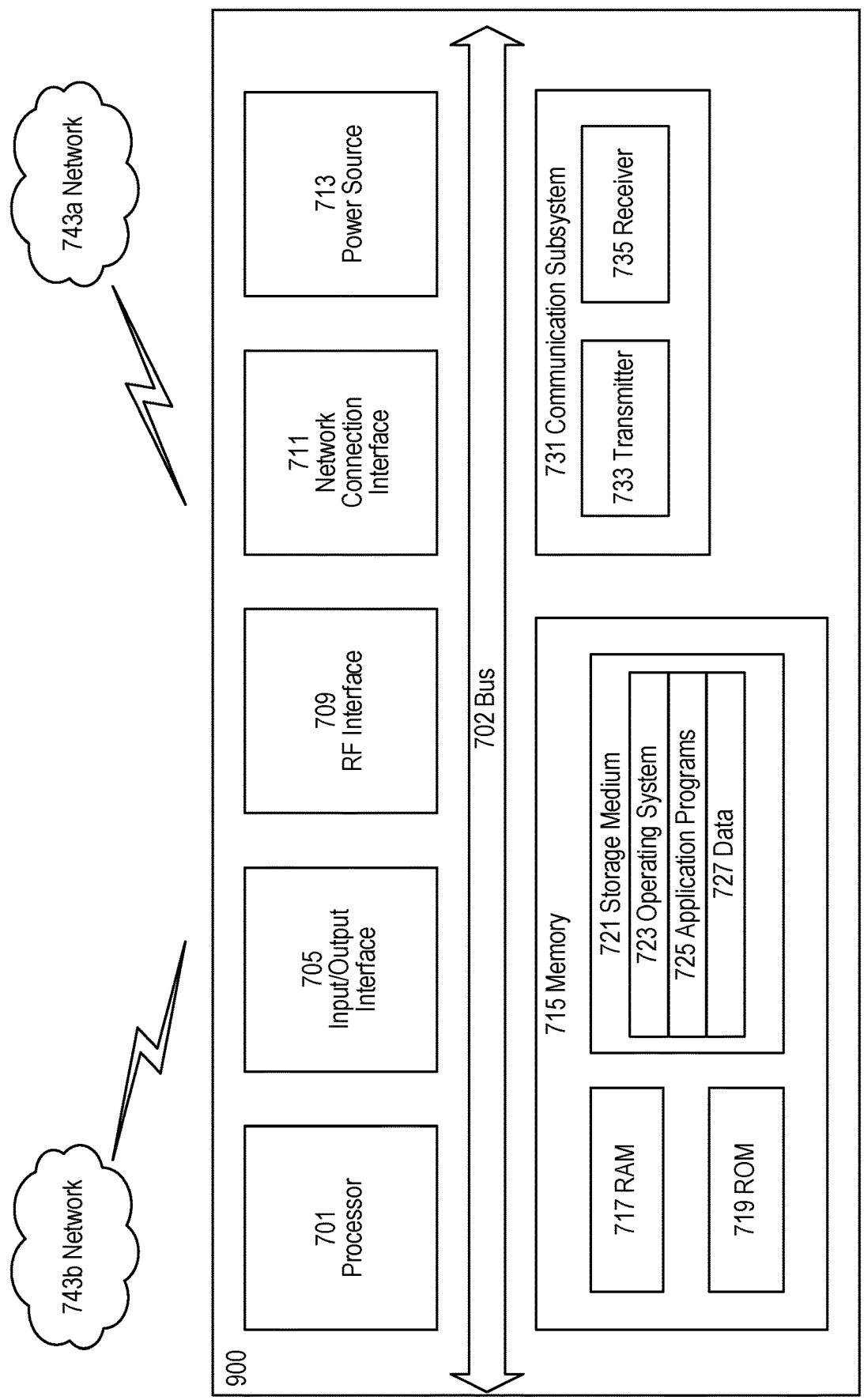
FIG. 7 is a block diagram of an exemplary user equipment (UE) configurable according to various exemplary embodiments of the present disclosure.

FIG. 7 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 700 can be any UE identified by the $3^{rd}$ Generation Partnership Project (3GPP), including a NB-IoT UE, a machine type communication (MTC) UE, and/or an enhanced MTC (eMTC) UE. UE 700, as illustrated in FIG. 7, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 7 is a UE, the components discussed herein are equally applicable to a WD, and vice-versa.

In FIG. 7, UE 700 includes processing circuitry 701 that is operatively coupled to input/output interface 705, radio frequency (RF) interface 709, network connection interface 711, memory 715 including random access memory (RAM) 717, read-only memory (ROM) 719, and storage medium 721 or the like, communication subsystem 731, power source 733, and/or any other component, or any combination thereof. Storage medium 721 includes operating system 723, application program 725, and data 727. In other embodiments, storage medium 721 can include other similar types of information. Certain UEs can utilize all of the components shown in FIG. 7, or only a subset of the components. The level of integration between the components can vary from one UE to another UE. Further, certain UEs can contain multiple instances of a component, such as multiple processors, memories, transceivers, transmitters, receivers, etc.

In FIG. 7, processing circuitry 701 can be configured to process computer instructions and data. Processing circuitry 701 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 701 can include two central processing units (CPUs). Data can be information in a form suitable for use by a computer.

In the depicted embodiment, input/output interface 705 can be configured to provide a communication interface to an input device, output device, or input and output device. UE 700 can be configured to use an output device via input/output interface 705. An output device can use the same type of interface port as an input device. For example, a USB port can be used to provide input to and output from UE 700. The output device can be a speaker, a sound card, a video card, a display, a monitor, a printer, an actuator, an emitter, a smartcard, another output device, or any combination thereof. UE 700 can be configured to use an input device via input/output interface 705 to allow and/or facilitate a user to capture information into UE 700. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 7, RF interface 709 can be configured to provide a communication interface to RF components such as a transmitter, a receiver, and an antenna. Network connection interface 711 can be configured to provide a communication interface to network 743*a*. Network 743*a* can encompass wired and/or wireless networks such as a local-area network (LAN), a wide-area network (WAN), a computer network, a wireless network, a telecommunications network, another like network or any combination thereof. For example, network 743*a* can comprise a Wi-Fi network. Network connection interface 711 can be configured to include a receiver and a transmitter interface used to communicate with one or more other devices over a communication network according to one or more communication protocols, such as Ethernet, TCP/IP, SONET, ATM, or the like. Network connection interface 711 can implement receiver and transmitter functionality appropriate to the communication network links (e.g., optical, electrical, and the like). The transmitter and receiver functions can share circuit components, software or firmware, or alternatively can be implemented separately.

RAM 717 can be configured to interface via bus 702 to processing circuitry 701 to provide storage or caching of data or computer instructions during the execution of software programs such as the operating system, application programs, and device drivers. ROM 719 can be configured to provide computer instructions or data to processing circuitry 701. For example, ROM 719 can be configured to store invariant low-level system code or data for basic system functions such as basic input and output (I/O), startup, or reception of keystrokes from a keyboard that are stored in a non-volatile memory. Storage medium 721 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 721 can be configured to include operating system 723, application program 725 such as a web browser application, a widget or gadget engine or another application, and data file 727. Storage medium 721 can store, for use by UE 700, any of a variety of various operating systems or combinations of operating systems.

Storage medium 721 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 721 can allow and/or facilitate UE 700 to access computer-executable instructions, application programs or the like, stored on transitory or non-transitory memory media, to off-load data, or to upload data. An article of manufacture, such as one utilizing a communication system can be tangibly embodied in storage medium 721, which can comprise a device readable medium.

In FIG. 7, processing circuitry 701 can be configured to communicate with network 743*b* using communication subsystem 731. Network 743*a* and network 743*b* can be the same network or networks or different network or networks. Communication subsystem 731 can be configured to include one or more transceivers used to communicate with network 743*b*. For example, communication subsystem 731 can be configured to include one or more transceivers used to communicate with one or more remote transceivers of another device capable of wireless communication such as another WD, UE, or base station of a radio access network (RAN) according to one or more communication protocols, such as IEEE 702.9, CDMA, WCDMA, GSM, LTE, UTRAN, WiMax, or the like. Each transceiver can include transmitter 733 and/or receiver 735 to implement transmitter or receiver functionality, respectively, appropriate to the RAN links (e.g., frequency allocations and the like). Further, transmitter 733 and receiver 735 of each transceiver can share circuit components, software, or firmware, or alternatively can be implemented separately.

In the illustrated embodiment, the communication functions of communication subsystem 731 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 731 can include cellular communication, Wi-Fi communication, Bluetooth communication, and GPS communication. Network 743b can encompass wired and/or wireless networks such as a local-area network (LAN), a wide-area network (WAN), a computer network, a wireless network, a telecommunications network, another like network or any combination thereof. For example, network 743b can be a cellular network, a Wi-Fi network, and/or a near-field network. Power source 713 can be configured to provide alternating current (AC) or direct current (DC) power to components of UE 700.

The features, benefits and/or functions described herein can be implemented in one of the components of UE 700 or partitioned across multiple components of UE 700. Further, the features, benefits, and/or functions described herein can be implemented in any combination of hardware, software, or firmware. In one example, communication subsystem 731 can be configured to include any of the components described herein. Further, processing circuitry 701 can be configured to communicate with any of such components over bus 702. In another example, any of such components can be represented by program instructions stored in memory that when executed by processing circuitry 701 perform the corresponding functions described herein. In another example, the functionality of any of such components can be partitioned between processing circuitry 701 and communication subsystem 931. In another example, the non-computationally intensive functions of any of such components can be implemented in software or firmware and the computationally intensive functions can be implemented in hardware.

Figure 8:
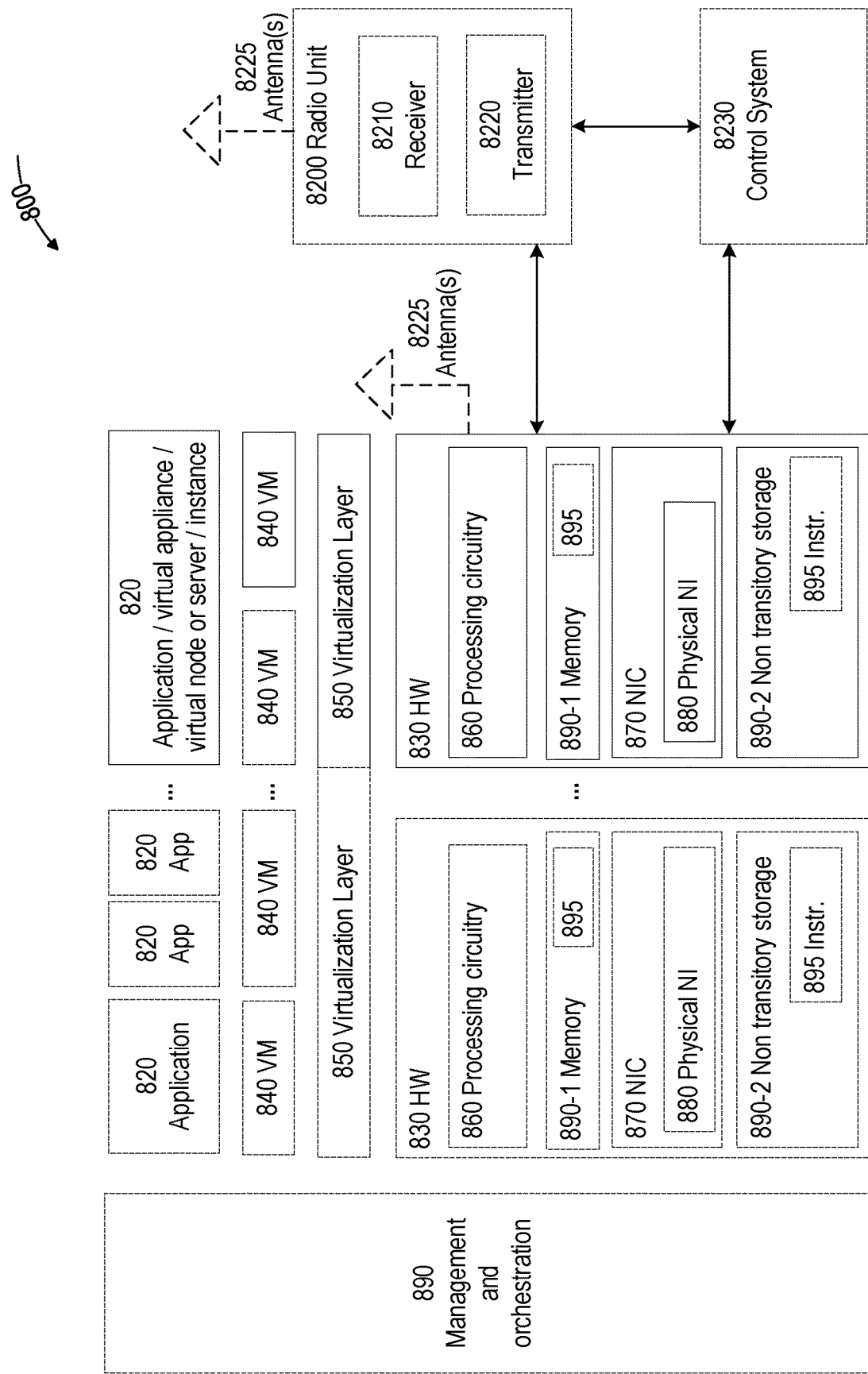
FIG. 8 is a block diagram illustrating a virtualization environment that can facilitate virtualization of various functions implemented according to various exemplary embodiments of the present disclosure.

FIG. 8 is a schematic block diagram illustrating a virtualization environment 800 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station, a virtualized radio access node, virtualized core network node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the network node can be entirely virtualized.

The functions can be implemented by one or more applications 820 (which can alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which can be commercial off-the-shelf (COTS) processors, dedicated Application Specific Integrated Circuits (ASICs), or any other type of processing circuitry including digital or analog hardware components or special purpose processors. Each hardware device can comprise memory 890-1 which can be non-persistent memory for temporarily storing instructions 895 or software executed by processing circuitry 860. Each hardware device can comprise one or more network interface controllers (NICs) 870, also known as network interface cards, which include physical network interface 880. Each hardware device can also include non-transitory, persistent, machine-readable storage media 890-2 having stored therein software 895 and/or instructions executable by processing circuitry 860. Software 895 can include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and can be run by a corresponding virtualization layer 850 or hypervisor. Different embodiments of the instance of virtual appliance 820 can be implemented on one or more of virtual machines 840, and the implementations can be made in different ways.

During operation, processing circuitry 860 executes software 895 to instantiate the hypervisor or virtualization layer 850, which can sometimes be referred to as a virtual machine monitor (VMM). Virtualization layer 850 can present a virtual operating platform that appears like networking hardware to virtual machine 840.

As shown in FIG. 8, hardware 830 can be a standalone network node with generic or specific components. Hardware 830 can comprise antenna 8225 and can implement some functions via virtualization. Alternatively, hardware 830 can be part of a larger cluster of hardware (e.g., such as in a data center or customer premise equipment (CPE)) where many hardware nodes work together and are managed via management and orchestration (MANO) 890, which, among others, oversees lifecycle management of applications 820.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 840 can be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

In the context of NFV, Virtual Network Function (VNF) is responsible for handling specific network functions that run in one or more virtual machines 840 on top of hardware networking infrastructure 830, and can correspond to application 820 in FIG. 8.

In some embodiments, one or more radio units 8200 that each include one or more transmitters 8220 and one or more receivers 8210 can be coupled to one or more antennas 8225. Radio units 8200 can communicate directly with hardware nodes 830 via one or more appropriate network interfaces and can be used in combination with the virtual components to provide a virtual node with radio capabilities, such as a radio access node or a base station.

In some embodiments, some signaling can be affected with the use of control system 8230 which can alternatively be used for communication between the hardware nodes 830 and radio units 8200.

Figure 9:
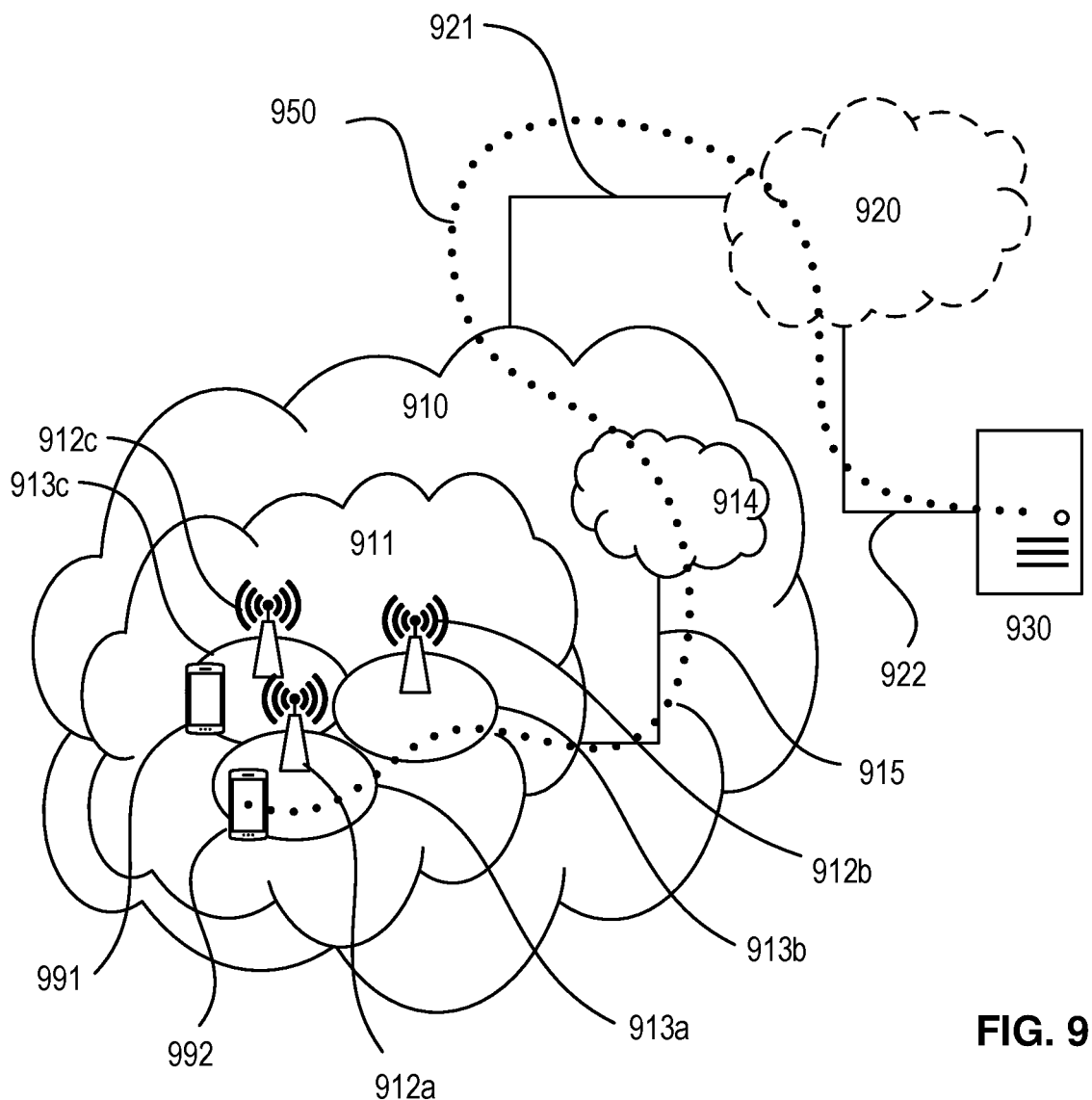
FIGS. 9-10 are block diagrams of exemplary communication systems configurable according to various exemplary embodiments of the present disclosure.

With reference to FIG. 9, in accordance with an embodiment, a communication system includes telecommunication network 910, such as a 3GPP-type cellular network, which comprises access network 911, such as a radio access network, and core network 914. Access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to core network 914 over a wired or wireless connection 915. A first UE 991 located in coverage area 913c can be configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the Telecommunication network 910 is itself connected to host computer 930, which can be embodied in the hardware and/or software of a standalone server, a cloud-implemented server, a distributed server or as processing resources in a server farm. Host computer 930 can be under the ownership or control of a service provider, or can be operated by the service provider or on behalf of the service provider. Connections 921 and 922 between telecommunication network 910 and host computer 930 can extend directly from core network 914 to host computer 930 or can go via an optional intermediate network 920. Intermediate network 920 can be one of, or a combination of more than one of, a public, private or hosted network; intermediate network 920, if any, can be a backbone network or the Internet; in particular, intermediate network 920 can comprise two or more sub-networks (not shown).

The communication system of FIG. 9 as a whole enables connectivity between the connected UEs 991, 992 and host computer 930. The connectivity can be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 can be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which can have storage and/or processing capabilities. In particular, processing circuitry 1018 can comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 can be operable to provide a service to a remote user, such as UE 1030 connecting via OTT connection 1050 terminating at UE 1030 and host computer 1010. In providing the service to the remote user, host application 1012 can provide user data which is transmitted using OTT connection 1050.

Communication system 1000 can also include base station 1020 provided in a telecommunication system and comprising hardware 1025 enabling it to communicate with host computer 1010 and with UE 1030. Hardware 1025 can include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10) served by base station 1020. Communication interface 1026 can be configured to facilitate connection 1060 to host computer 1010. Connection 1060 can be direct or it can pass through a core network (not shown in FIG. 10) of the telecommunication system and/or through one or more intermediate networks outside the telecommunication system. In the embodiment shown, hardware 1025 of base station 1020 can also include processing circuitry 1028, which can comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 can also include UE 1030 already referred to. Its hardware 1035 can include radio interface 1037 configured to set up and maintain wireless connection 1070 with a base station serving a coverage area in which UE 1030 is currently located. Hardware 1035 of UE 1030 can also include processing circuitry 1038, which can comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 can be operable to provide a service to a human or non-human user via UE 1030, with the support of host computer 1010. In host computer 1010, an executing host application 1012 can communicate with the executing client application 1032 via OTT connection 1050 terminating at UE 1030 and host computer 1010. In providing the service to the user, client application 1032 can receive request data from host application 1012 and provide user data in response to the request data. OTT connection 1050 can transfer both the request data and the user data. Client application 1032 can interact with the user to generate the user data that it provides.

Figure 10:
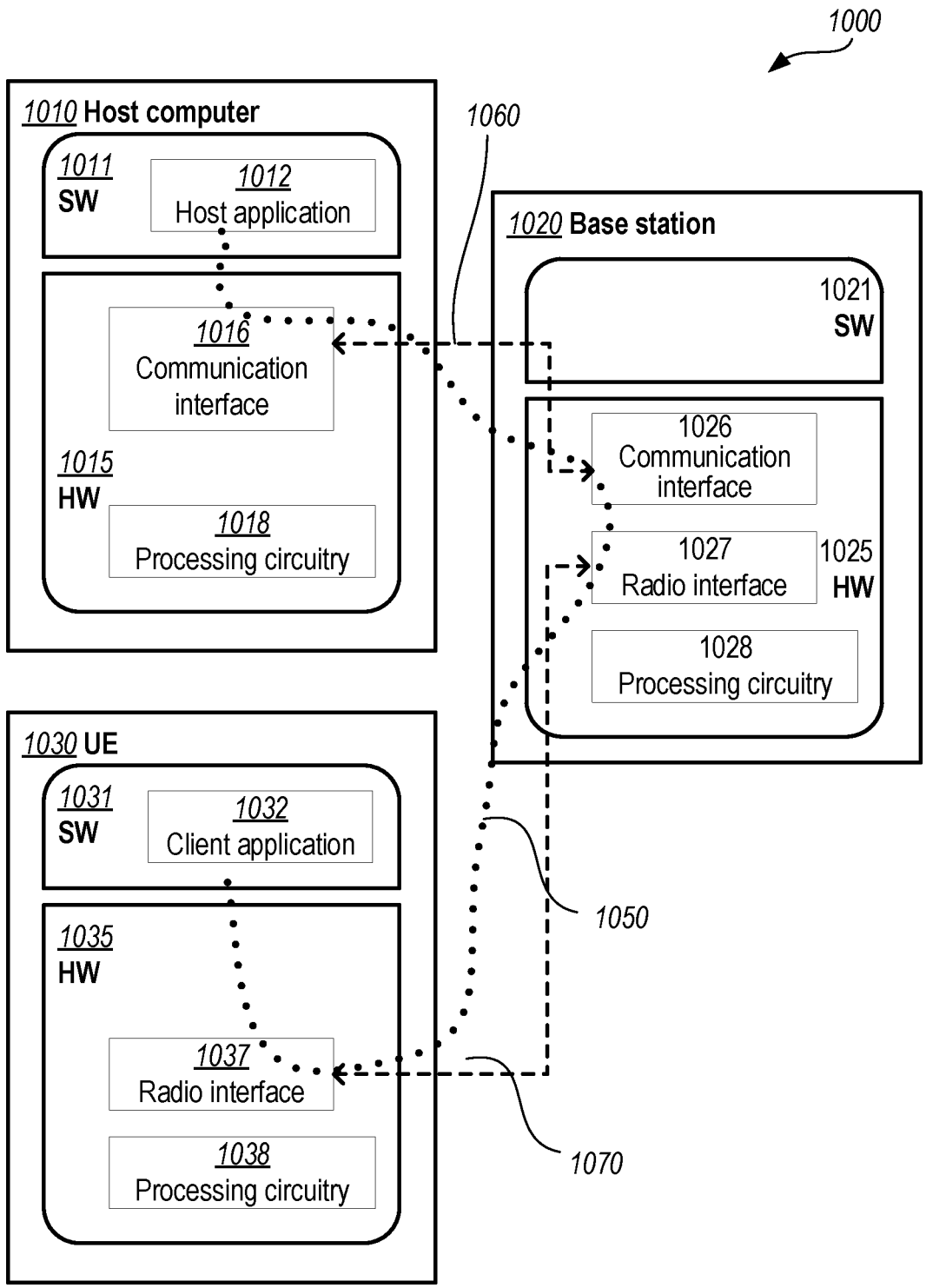

It is noted that host computer 1010, base station 1020 and UE 1030 illustrated in FIG. 10 can be similar or identical to host computer 930, one of base stations 912*a*, 912*b*, 912*c* and one of UEs 991, 992 of FIG. 9, respectively. This is to say, the inner workings of these entities can be as shown in FIG. 10 and independently, the surrounding network topology can be that of FIG. 9.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure can determine the routing, which it can be configured to hide from UE 1030 or from the service provider operating host computer 1010, or both. While OTT connection 1050 is active, the network infrastructure can further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency, and other network operational aspects on which the one or more embodiments improve. There can further be an optional network functionality for reconfiguring OTT connection 1050 between host computer 1010 and UE 1030, in response to variations in the measurement results. The measurement procedure and/or the network functionality for reconfiguring OTT connection 1050 can be implemented in software 1011 and hardware 1015 of host computer 1010 or in software 1031 and hardware 1035 of UE 1030, or both. In embodiments, sensors (not shown) can be deployed in or in association with communication devices through which OTT connection 1050 passes; the sensors can participate in the measurement procedure by supplying values of the monitored quantities exemplified above, or supplying values of other physical quantities from which software 1011, 1031 can compute or estimate the monitored quantities. The reconfiguring of OTT connection 1050 can include message format, retransmission settings, preferred routing etc.; the reconfiguring need not affect base station 1020, and it can be unknown or imperceptible to base station 1020. Such procedures and functionalities can be known and practiced in the art. In certain embodiments, measurements can involve proprietary UE signaling facilitating host computer 1010's measurements of throughput, propagation times, latency and the like. The measurements can be implemented in that software 1011, 1031 causes messages to be transmitted, in particular empty or 'dummy' messages, using OTT connection 1050 while it monitors propagation times, errors etc.

FIG. 11 is a flowchart illustrating an exemplary method and/or procedure implemented in a communication system, in accordance with one embodiment. The communication system includes a host computer, a base station and a UE which, in some exemplary embodiments, can be those described with reference to FIGS. 9 and 10. For simplicity of the present disclosure, only drawing references to FIG. 11 will be included in this section. In step 1110, the host computer provides user data. In substep 1111 (which can be optional) of step 1110, the host computer provides the user data by executing a host application. In step 1120, the host computer initiates a transmission carrying the user data to the UE. In step 1130 (which can be optional), the base station transmits to the UE the user data which was carried in the transmission that the host computer initiated, in accordance with the teachings of the embodiments described throughout this disclosure. In step 1140 (which can also be optional), the UE executes a client application associated with the host application executed by the host computer.

FIG. 12 is a flowchart illustrating an exemplary method and/or procedure implemented in a communication system, in accordance with one embodiment. The communication system includes a host computer, a base station and a UE which can be those described with reference to FIGS. 9 and 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission can pass via the base station, in accordance with the teachings of the embodiments described throughout this disclosure. In step 1230 (which can be optional), the UE receives the user data carried in the transmission.

FIG. 13 is a flowchart illustrating an exemplary method and/or procedure implemented in a communication system, in accordance with one embodiment. The communication system includes a host computer, a base station and a UE which can be those described with reference to FIGS. 9 and 10. For simplicity of the present disclosure, only drawing references to FIG. 13 will be included in this section. In step 1310 (which can be optional), the UE receives input data provided by the host computer. Additionally or alternatively, in step 1320, the UE provides user data. In substep 1321 (which can be optional) of step 1320, the UE provides the user data by executing a client application. In substep 1311 (which can be optional) of step 1310, the UE executes a client application which provides the user data in reaction to the received input data provided by the host computer. In providing the user data, the executed client application can further consider user input received from the user. Regardless of the specific manner in which the user data was provided, the UE initiates, in substep 1330 (which can be optional), transmission of the user data to the host computer. In step 1340 of the method, the host computer receives the user data transmitted from the UE, in accordance with the teachings of the embodiments described throughout this disclosure.

FIG. 14 is a flowchart illustrating an exemplary method and/or procedure implemented in a communication system, in accordance with one embodiment. The communication system includes a host computer, a base station and a UE which can be those described with reference to FIGS. 9 and 10. For simplicity of the present disclosure, only drawing references to FIG. 14 will be included in this section. In step 1410 (which can be optional), in accordance with the teachings of the embodiments described throughout this disclosure, the base station receives user data from the UE. In step 1420 (which can be optional), the base station initiates transmission of the received user data to the host computer. In step 1430 (which can be optional), the host computer receives the user data carried in the transmission initiated by the base station.

The exemplary embodiments described herein provide techniques for pre-configuring a UE for operation in a 3GPP non-terrestrial network (NTN). Such embodiments reduce the time needed for initial acquisition of an NTN (e.g., PLMN) and a cell within the NTN. This can provide various benefits and/or advantages, including reducing UE energy consumption (or, equivalently, increasing UE operational time on one battery charge) and improving user access to services provided by an NTN. When used in UEs and/or network nodes, exemplary embodiments described herein can enable UEs to access network resources and OTT services more consistently and without interruption. This improves the availability and/or performance of these services as experienced by OTT service providers and end-users, including more consistent data throughout and fewer delays without excessive UE power consumption or other reductions in user experience.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Examples of the methods, apparatus, and computer-readable media described herein include, but are not limited to, the following enumerated examples:

Example (a). A method, in a radio network node, for aligning a network system clock with initiating a propagation delay compensation procedure for a wireless device, the method comprising:

determining that a propagation delay compensation procedure for the wireless device is to be initiated or has been initiated; and sending an indication of a network system clock time to the wireless device in association with the propagation delay compensation procedure.

Example (b). The method of Example (a), wherein said determining is based on one or both of the following:

a periodic indication that the propagation delay compensation procedure is to be initiated; and detecting that uplink synchronization for the wireless device deviates from a nominal synchronization level by at least a predetermined amount.

Example (c). The method of Example (a), wherein the propagation delay compensation procedure is triggered by a determination that network system clock time is to be sent to the wireless device.

Example (d). The method of any of Examples (a)-(c), wherein the propagation delay compensation procedure comprises a timing advance procedure.

Example (e). The method of Example (d), wherein the method further comprises performing the timing advance procedure, and wherein performing the timing advance procedure comprises determining that the wireless device is able to receive enhanced timing advance values, the enhanced timing advance values reflecting smaller variations in uplink synchronization than provided to wireless devices unable to receive enhanced timing advance values, and providing the wireless device with an enhanced timing advance value as part of the timing advance procedure.

Example (f). The method of any of Examples (a)-(e), wherein the method comprises performing the propagation delay compensation procedure and providing the indication of the network system clock time in signaling of the propagation delay compensation procedure or in signaling sent along with signaling of the propagation delay compensation procedure.

Example (g). The method of any of Examples (a)-(f), wherein the indication of the network system clock time is sent in a Radio Resource Configuration, RRC, message, and wherein the method comprises performing the propagation delay compensation procedure in association with sending the RRC message.

Example (h). The method of any of Examples (a)-(g), wherein the network system clock time is a 5G network system time.

Example (i). A method, in a wireless device, for aligning a network system clock with tracking of propagation delay from a radio network node, the method comprising:

receiving an indication of a network system clock time from the radio network node; and performing a propagation delay compensation procedure for the wireless device in association with receiving said indication.

Example (j). The method of Example (i), wherein the method comprises:

detecting a change in channel conditions that affects timing;

triggering the propagation delay compensation procedure in response to said detecting; and receiving the indication of the network system clock time in signaling of the propagation delay compensation or in signaling sent along with signaling of the propagation delay compensation.

Example (k). The method of Example (i), wherein the propagation delay compensation procedure is triggered by a determination that network system clock time has been sent or is to be sent to the wireless device.

Example (l). The method of any of Examples (i)-(k), wherein the propagation delay compensation procedure comprises a timing advance procedure.

Example (m). The method of Example (l), wherein the method further comprises receiving an enhanced timing advance value as part of the timing advance procedure, the enhanced timing advance value reflecting smaller variations in uplink synchronization than provided to wireless devices unable to receive enhanced timing advance values.

Example (n). The method of any of Examples (i)-(m), wherein the propagation delay compensation procedure comprises timing advance compensation performed autonomously by the wireless device.

Example (o). The method of Example (n), wherein the timing advance compensation performed autonomously by the wireless device comprises monitoring one or more reference signals and/or synchronization signals and adjusting timing advance in response to detected variations in timing for the reference signals and/or synchronization signals.

Example (p). The method of any of Examples (i)-(o), wherein the indication of the network system clock time is received in a Radio Resource Configuration, RRC, message, and wherein the method comprises performing the propagation delay compensation procedure in association with receiving the RRC message.

Example (q). The method of any of Examples (i)-(p), wherein the network system clock time is a 5G network system time.

Example (r). A user equipment (UE) configured to operate in a radio access network, the UE comprising:

radio interface circuitry configured to communicate with a network node via at least one cell; and processing circuitry operably coupled to the radio interface circuitry, whereby the processing circuitry and the radio interface circuitry are configured to perform operations corresponding to any of the methods of Examples (i)-(q).

Example (s). A user equipment (UE) configured to operate in a radio access network, the UE being further arranged to perform operations corresponding to any of the methods of Examples (i)-(q).

Example (t). A non-transitory, computer-readable medium storing computer-executable instructions that, when executed by processing circuitry of a user equipment (UE), configure the UE to perform operations corresponding to any of the methods of Examples (i)-(q).

Example (u). A computer program product comprising computer-executable instructions that, when executed by processing circuitry of a user equipment (UE), configure the UE to perform operations corresponding to any of the methods of Examples (i)-(q).

Example (v). A network node configured to serve at least one cell in a radio access network, the network node comprising:

radio interface circuitry configured to communicate with user equipment (UEs) via the at least one cell; and processing circuitry operably coupled to the radio interface circuitry, whereby the processing circuitry and the radio interface circuitry are configured to perform operations corresponding to any of the methods of Examples (a)-(h).

Example (w). A network node configured to serve at least one cell in a radio access network, the network node being further arranged to perform operations corresponding to any of the methods of Examples (a)-(h).

Example (x). A non-transitory, computer-readable medium storing computer-executable instructions that, when executed by processing circuitry of a network node, configure the network node to perform operations corresponding to any of the methods of Examples (a)-(h).

Example (y). A computer program product comprising computer-executable instructions that, when executed by processing circuitry of a network node in a radio access network, configure the network node to perform operations corresponding to any of the methods of Examples (a)-(h).

ABBREVIATIONS

3GPP 3$^{rd}$ Generation Partnership Project
5G 5$^{th}$ Generation
PD Propagation Delay
TS Time Synchronization
TA Timing Advance
PTP Precision Time Protocol
RTT Round-Trip-Time
OTA Over-The-Air
D2D Device-To-Device
RRC Radio Resource Control
SFN Super-Frame Number
MAC Media Access Control
RAR Radio Access Response
DL Downlink
UL Uplink
5GS 5G System
SIB System Information Block
CE Control Element
gNB Next Generation NodeB
LTE Long-Term Evolution
NR New Radio
TTI Transmission Time Interval
UE User Equipment
URLLC Ultra-Reliable and Low-Latency Communications
ppb Parts Per Billion

The invention claimed is:

1. A method, in a network node, for aligning sending of a network system clock time to a wireless device with initiating a propagation delay compensation procedure for the wireless device, the method comprising:
   determining that a propagation delay compensation procedure to adjust uplink transmission timing for the wireless device is to be initiated or has been initiated; and, responsive to said determining, sending an indication of a network system clock time to the wireless device in association with the propagation delay compensation procedure;
wherein the propagation delay compensation procedure comprises a timing advance procedure and wherein the method further comprises:
   determining that the wireless device is able to receive enhanced timing advance values, the enhanced timing advance values reflecting smaller variations in uplink synchronization than provided to wireless devices unable to receive enhanced timing advance values; and
   providing the wireless device with an enhanced timing advance value as part of the timing advance procedure.

2. The method of claim 1, wherein said determining is based on one or both of the following:
   a periodic indication that the propagation delay compensation procedure is to be initiated; and
   detecting that uplink synchronization for the wireless device deviates from a nominal synchronization level by at least a predetermined amount.

3. The method of claim 1, wherein the propagation delay compensation procedure is based on measurements of both uplink reference signals and downlink reference signals.

4. The method of claim 1, wherein the method comprises providing the indication of the network system clock time in signaling used to perform the timing advance procedure or in signaling sent along with performing the timing advance procedure.

5. The method of claim 4, wherein the method comprises providing the indication of the network system clock time in signaling used to perform the timing advance procedure.

6. The method of claim 1, wherein the indication of the network system clock time is sent in a Radio Resource Configuration (RRC) message, and wherein the method comprises performing the timing advance procedure in association with sending the RRC message.

7. The method of claim 1, wherein the network system clock time is a 5G network system time.

8. A method, in a wireless device, for aligning reception of a network system clock time from a network node with a propagation delay compensation procedure, the method comprising:
   receiving an indication of a network system clock time from the network node; and
   performing a propagation delay compensation procedure to adjust uplink transmission timing for the wireless device in association with receiving said indication;
wherein the propagation delay compensation procedure comprises a timing advance procedure, and wherein the method further comprises receiving an enhanced timing advance value as part of the timing advance procedure, the enhanced timing advance value reflecting smaller variations in uplink synchronization than provided to wireless devices unable to receive enhanced timing advance values.

9. The method of claim 8, wherein the method comprises:
   detecting a change in channel conditions that affects timing;
   triggering the timing advance procedure in response to said detecting; and
   receiving the indication of the network system clock time in signaling used to perform the timing advance procedure or in signaling sent along with performing the timing advance procedure.

10. The method of claim 9, wherein the method comprises receiving the indication of the network system clock time in signaling used to perform the timing advance procedure.

11. The method of claim 8, wherein the propagation delay compensation procedure is based on measurements of both uplink reference signals and downlink reference signals.

12. The method of claim 8, wherein the indication of the network system clock time is received in a Radio Resource Configuration (RRC) message, and wherein the method comprises performing the timing advance procedure in association with receiving the RRC message.

13. The method of claim 8, wherein the network system clock time is a 5G network system time.

14. A wireless device configured to operate in a wireless network, the wireless device comprising:
   radio front end circuitry configured to communicate with a network node via at least one cell; and
   processing circuitry connectable to the radio front end circuitry, whereby the processing circuitry and the radio front end circuitry are configured to perform operations corresponding to the method of claim 8.

15. A non-transitory, computer-readable medium storing computer-executable instructions that, when executed by processing circuitry of a wireless device, configure the wireless device to perform operations corresponding to the method of claim 8.

16. A network node configured to serve at least one cell in a wireless network, the network node comprising:
- radio front end circuitry configured to communicate with a wireless device via the at least one cell; and
- processing circuitry connectable to the radio front end circuitry, whereby the processing circuitry and the radio front end circuitry are configured to:
  - determine that a propagation delay compensation procedure to adjust uplink transmission timing for the wireless device is to be initiated or has been initiated; and,
  - responsive to said determining, send an indication of a network system clock time to the wireless device in association with the propagation delay compensation procedure;
- wherein the propagation delay compensation procedure comprises a timing advance procedure and wherein the processing circuitry and the radio front end circuitry are further configured to:
  - determine that the wireless device is able to receive enhanced timing advance values, the enhanced timing advance values reflecting smaller variations in uplink synchronization than provided to wireless devices unable to receive enhanced timing advance values; and
  - provide the wireless device with an enhanced timing advance value as part of the timing advance procedure.

17. A non-transitory, computer-readable medium storing computer-executable instructions that, when executed by processing circuitry of a network node, configure the network node to perform operations corresponding to the method of claim 1.

* * * * *